(12) United States Patent
Gao et al.

(10) Patent No.: US 11,308,633 B2
(45) Date of Patent: Apr. 19, 2022

(54) APPARATUS AND METHOD FOR FIDUCIAL MARKER ALIGNMENT IN ELECTRON TOMOGRAPHY

(71) Applicant: KING ABDULLAH UNIVERSITY OF SCIENCE AND TECHNOLOGY, Thuwal (SA)

(72) Inventors: Xin Gao, Thuwal (SA); Renmin Han, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 0 days.

(21) Appl. No.: 16/642,590

(22) PCT Filed: Oct. 18, 2018

(86) PCT No.: PCT/IB2018/058088
§ 371 (c)(1),
(2) Date: Feb. 27, 2020

(87) PCT Pub. No.: WO2019/082029
PCT Pub. Date: May 2, 2019

(65) Prior Publication Data
US 2020/0349725 A1 Nov. 5, 2020

Related U.S. Application Data

(60) Provisional application No. 62/690,013, filed on Jun. 26, 2018, provisional application No. 62/577,954, filed on Oct. 27, 2017.

(51) Int. Cl.
*G06T 7/33* (2017.01)
*G06T 3/00* (2006.01)
*G06T 7/00* (2017.01)

(52) U.S. Cl.
CPC .............. *G06T 7/33* (2017.01); *G06T 3/0075* (2013.01); *G06T 7/0012* (2013.01);
(Continued)

(58) Field of Classification Search
CPC . G06T 2207/10061; G06T 2207/10072; G06T 2207/30204; G06T 3/0075; G06T 7/0012; G06T 7/33
See application file for complete search history.

(56) References Cited

U.S. PATENT DOCUMENTS 10,356,391 B1 * 7/2019 Eftink ........................ G06T 7/74
2001/0034482 A1 * 10/2001 Webber ................. G06T 11/005
600/407

(Continued)

OTHER PUBLICATIONS

Han, R. et al., "A Fast Fiducial Marker Tracking Model for Fully Automatic Alignment in Electron Tomography," Bioinformatics, Oct. 23, 2017, vol. 34, No. 5, pp. 853-863, Oxford University Press.

(Continued)

*Primary Examiner* — Ian L Lemieux
(74) *Attorney, Agent, or Firm* — Patent Portfolio Builders PLLC

(57) ABSTRACT

Provided is an apparatus and method for aligning fiducial markers. The apparatus may align positions of the fiducial markers on the two or more micrographs forming a two or more point sets corresponding to the two or more micrographs; create a first set of matched fiducial markers and unmatched fiducial markers; transform unmatched fiducial markers into transformed point sets and match the unmatched fiducial markers resulting in a second set of matched fiducial markers. The matching of the second set of matched fiducial markers results in improved alignment of a large number of fiducial markers. The aligned positions of fiducial markers may be constrained by an upper bound of (Continued)

transformation deviation of aligning positions of fiducial markers on two or more micrographs.

20 Claims, 19 Drawing Sheets

(52) U.S. Cl.
CPC ............... *G06T 2207/10061* (2013.01); *G06T 2207/10072* (2013.01); *G06T 2207/30204* (2013.01)

(56) References Cited

U.S. PATENT DOCUMENTS

| | | | | |
|---|---|---|---|---|
| 2006/0257051 | A1* | 11/2006 | Zavadsky | G06T 3/4038 |
| | | | | 382/294 |
| 2008/0240613 | A1* | 10/2008 | Dietz | G02B 21/367 |
| | | | | 382/284 |
| 2013/0058581 | A1* | 3/2013 | Zhang | G01B 11/005 |
| | | | | 382/201 |
| 2014/0126801 | A1* | 5/2014 | Callahan | G06K 9/0014 |
| | | | | 382/133 |
| 2014/0177941 | A1* | 6/2014 | Docherty | G02B 21/367 |
| | | | | 382/151 |
| 2015/0131888 | A1* | 5/2015 | Caprioli | G06K 9/6211 |
| | | | | 382/133 |
| 2019/0237186 | A1* | 8/2019 | El-Baz | G16H 30/40 |
| 2020/0294763 | A1* | 9/2020 | Chang | G02B 21/0076 |

OTHER PUBLICATIONS

International Search Report in corresponding/related International Application No. PCT/IB2018/058088, dated Jan. 8, 2019.
Written Opinion of the International Searching Authority in corresponding/related International Application No. PCT/IB2018/058088, dated Jan. 8, 2019.
Han, R. et al., "A Novel Fully Automatic Scheme for Fiducial Marker-Based Alignment in Electron Tomography," Journal of Structural Biology, Oct. 1, 2015, vol. 192, pp. 403-417, Elsevier Inc.

* cited by examiner

Distribution of the track length

Overlay of raw tracks (the x-y coordinates)

Overlay of aligned tracks(the x-y coordinates)

LOCATIONS OF MARKER(y)
Overlay of aligned tracks(the y-z coordinates)

APPARATUS AND METHOD FOR FIDUCIAL MARKER ALIGNMENT IN ELECTRON TOMOGRAPHY

CROSS REFERENCE TO RELATED APPLICATIONS

This application is a U.S. National Stage Application of International Application No. PCT/IB2018/058088, filed on Oct. 18, 2018, which claims the benefit of U.S. Provisional Application No. 62/577,954 filed Oct. 27, 2017 and U.S. Provisional Application No. 62/690,013 filed Jun. 26, 2018, which are hereby incorporated by reference in their entirety.

BACKGROUND

Nowadays, three-dimensional (3D) structural analysis based on electron microscopy plays an important role in the field of structural biology. Among the various applications, electron tomography (ET) acts as a bridge between high-resolution structural analysis and cellular imaging. In ET, the 3D ultrastructure is reconstructed from a series of micrographs (tilt series) taken in different orientations. In some cases, the projection parameters can be recorded from the goniometer and used for further reconstruction. However, due to mechanical instability and specimen transformation, the recorded micrographs do not exactly align with the recorded parameters. To obtain high-quality 3D density from the tilt series, in some cases, it may be necessary to recalculate the projection parameters (i.e., tilt series alignment) before reconstruction.

Applicant has identified a number of deficiencies and problems associated with conventional tilt series alignment. Through applied effort, ingenuity, and innovation, many of these identified problems have been solved by developing solutions that are included in embodiments of the present invention, many examples of which are described in detail herein.

BRIEF SUMMARY

In general, embodiments of the present invention provided herein include apparatuses, methods, devices, and computer program products for aligning fiducial markers, fiducial marker tracking, and electron tomography. In some embodiments, provided is an apparatus for fiducial marker alignment, the apparatus comprising a processor and a memory storing computer instructions that, when executed by the processor, cause the apparatus to align positions of the fiducial markers on two or more micrographs forming two or more point sets corresponding to the two or more micrographs; create a first set of matched fiducial markers and unmatched fiducial markers; transform unmatched fiducial markers into transformed point sets and match the unmatched fiducial markers resulting in a second set of matched fidicual markers. The matching of the second set of matched fiducial markers results in improved alignment of a large number of fiducial markers.

In some embodiments, aligning positions of fiducial markers may be by an affine transformation. The affine transformation may be constrained by an upper bound of transformation deviation. Creating the first set of matched fiducial markers may include applying a Guassian mixture model. Transforming unmatched fiducial markers may include applying a second affine transformation.

In some embodiments, the computer instructions may be configured to, when executed by the processor, cause the apparatus to repeatedly transform unmatched fiducial markers into an additional point set and match the unmatched fiducial markers resulting in additional matched fiducial markers until no more additional matched fiducial markers can be created. In some embodiments, the two or more micrographs may have a tilt angle and none of the tilt angles of each of the two or more micrographs may be equal. The tilt angles of each of the two or more micrographs may differ by a single tilt angle interval and the tilt angle interval may be about 20° or less. The tilt angles of each of the two or more micrographs each may differ by a tilt angle interval and at least one of the tilt angle intervals is at least 50°.

Provided herein are also methods for fiducial marker alignment, fiducial marker tracking, and electron tomography. In some embodiments, provided is a method for fiducial marker alignment, the method comprising aligning positions of the fiducial markers on two or more micrographs forming two or more point sets corresponding to the two or more micrographs; creating a first set of matched fiducial markers and unmatched fiducial markers; transforming unmatched fiducial markers into transformed point sets and match the unmatched fiducial markers resulting in a second set of matched fidicual markers. The matching of the second set of matched fiducial markers may result in improved alignment of a large number of fiducial markers.

In some embodiments, aligning positions of fiducial markers may be by an affine transformation. The affine transformation may be constrained by an upper bound of transformation deviation. Creating the first set of matched fiducial markers may include applying a Guassian mixture model. Transforming unmatched fiducial markers may include applying a second affine transformation.

In some embodiments, the method may further include repeatedly transforming unmatched fiducial markers into an additional point set and matching the unmatched fiducial markers resulting in additional matched fiducial markers until no more additional matched fiducial markers can be created.

In some embodiments, each of the two or more micrographs may have a tilt angle and none of the tilt angles of each of the two or more micrographs may be equal. The tilt angles of each of the two or more micrographs may differ by a single tilt angle interval and the tilt angle interval is about 20° or less. The tilt angles of each of the two or more micrographs may each differ by a tilt angle interval and at least one of the tilt angle intervals is at least 50°.

Some embodiments are also directed to a fiducial marker alignment apparatus and an electron tomography apparatus.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

Reference will now be made to the accompanying drawings, which are not necessarily drawn to scale, and wherein.

DETAILED DESCRIPTION

Figure 1:
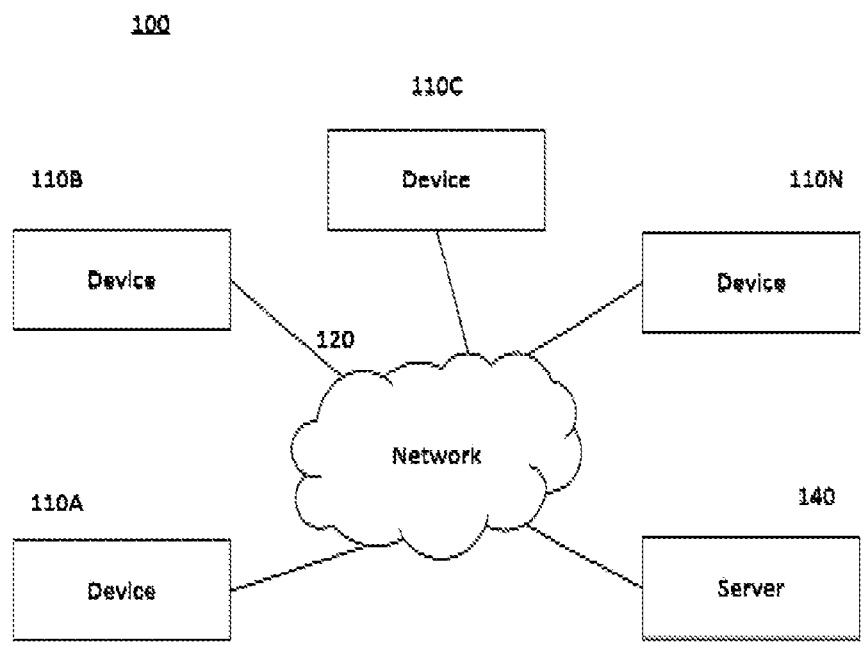
FIG. 1 illustrates an example system in accordance with some embodiments discussed herein.

Various embodiments of the inventions now will be described more fully hereinafter, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level.

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "user" should be understood to refer to an individual, group of individuals, business, organization, and the like; the users referred to herein are accessing a group-based communication or messaging system using client devices.

Overview

Provided herein are systems, methods, devices, and computer program products to align fiducial markers.

Tilt series alignment is one of the most important stages in the electron tomography process, which can be classified into two categories: marker-free alignment and marker-based alignment. Marker-free alignment uses the intrinsic ultrastructures from specimens to calibrate the projection parameters. Some available marker-free alignment methods include cross-correlation, common-lines, iterative alignment methods combining cross-correlation with reconstruction and reprojection, and feature-based alignment methods. Though marker-free alignment may not need any additional information of the specimen, it suffers from the low signal-to-noise ratio (SNR) of electron micrographs, especially in cryo-ET datasets. The other alignment category, fiducial marker-based alignment, which may use gold beads embedded in the specimens, may be more robust to noise owing to the high contrast of the gold beads. Currently, fiducial marker-based alignment is the most widely-used method in high-resolution electron tomography. Moreover, for the large-field datasets with obvious lens distortions, the non-straight electron beam trajectory model may be preferred and thus fiducial marker-based alignment may be the only option.

The rapid development of electron microscopy technologies has caused the explosion of data in ET. A large number of researchers began to use subtomogram averaging to analyze high-resolution structures in situ. In addition, large-field micrographs have become widely used. The exploding size of data necessitates the development of more efficient alignment methods and devices.

A number of marker-based alignment methods have been proposed. Based on their tracking strategies, the methods can be categorized into two groups: spatial-marker-based automatic alignment and model-based automatic alignment. IMOD's latest automatic alignment is a classic spatial-marker-based alignment. IMOD's scheme begins with the selection of initial micrographs near the zero tilt angle and the detection of fiducial marker positions. These fiducial markers are then tracked and pre-reconstructed in the 3D spatial space, from which 2D reprojections are generated and used as references for further fiducial marker tracking in the entire tilt series. Though spatial-marker-based alignment tracks the fiducial markers exactly according to the projection model, it may still require the determination of the correspondence between the 2D predicted fiducial marker reprojections and the measured fiducial marker positions ("motion prediction"). On the other hand, model-based alignment may directly use the information of measured fiducial marker positions to achieve fiducial marker tracking. The tracking in model-based alignment may be based on a predefined mathematical model, such as the Markov random field or the random sample consensus (RANSAC). The fiducial marker tracking strategy used in model-based automatic alignment may be simpler but not exactly accordant with the projection model.

Despite the aforementioned efforts, several concerns still remain. Potential failures have been observed in spatial-marker-based alignment due to its long workflow, in which the neighbor searching used in motion prediction is a weak point. Compared with the spatial-marker-based alignment, model-based alignment has a simpler workflow and has been proven to be successful in applications like cryo-ET. However, the relationship between the model-based alignment's mathematical model and the real projection model still remains to be elucidated. Execution time is another issue for automatic marker-based alignment. Markov random field is a good attempt for fiducial marker tracking but may cost too much time in local information analysis. The RANSAC model utilizes the global information of fiducial marker positions but may encounter an increasing computational cost when the number of fiducial marker increases.

Alignment, especially fiducial marker-based alignment, has become increasingly important due to the high demand of subtomogram averaging and the rapid development of large-field electron microscopy. Among the alignment steps, fiducial marker tracking may be a crucial one that determines the quality of the final alignment. Yet, it is still a challenging problem to track the fiducial markers accurately and effectively.

In accordance with certain embodiments, a robust and efficient scheme for fiducial marker tracking is provided. In some embodiments, the upper bound of the transformation deviation of aligning the positions of fiducial markers on two micrographs by affine transformation was determined. Then, in some embodiments, a method based on the Gaussian mixture model to accelerate the procedure of fiducial marker tracking was designed. Then, in some embodiments, a divide-and-conquer strategy against lens distortions to improve the reliability of the scheme was developed. As such, certain embodiments discussed herein relate the projection model with the tracking model. Accordingly, tracking for datasets with a massive number of fiducial markers may be achieved in accordance with certain embodiments.

Provided herein, the upper bound of the transformation deviation of aligning the positions of fiducial markers on two micrographs by affine transformation is determined, which theoretically reveals the relationship of model-based alignment and the projection model. The given upper bound of the deviation may be an instructive guide for further design and may be useful in both model-based alignment and motion prediction of spatial marker-based alignment. In addition, in some embodiments, a Gaussian mixture model (GMM) may be used to make fiducial marker tracking more effective and efficient. Also, in some embodiments, a divide-and-conquer strategy against lens distortions to ensure the reliability of the method and apparatus may be used. Provided herein are experimental results that further support the theoretical bound and demonstrate the effectiveness of the present method and apparatus. The present disclosure may make fiducial marker tracking for datasets with a massive number of fiducial markers possible.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 shows system 100 including an example network architecture for a system, which may include one or more devices and sub-systems that are configured to implement some embodiments discussed herein. For example, system 100 may include server 140, which can include, for example, the circuitry disclosed in FIGS. 2-4, a server, or database, among other things (not shown). The server 140 may include any suitable network server and/or other type of processing device. In some embodiments, the server 140 may determine and transmit commands and instructions for rendering one or more group-based communication channels to devices 110A-110N using data from the communications database 300. The fiducial marker database 300 may be embodied as a data storage device such as a Network Attached Storage (NAS) device or devices, or as a separate database server or servers. The fiducial marker database 300 includes information accessed and stored by the server 140 to facilitate the operations of the system 100.

Server 140 can communicate with one or more devices 110A-110N via network 120. In this regard, network 120 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 120 may include a cellular telephone, an 802.11, 802.16, 802.20, and/or WiMax network. Further, the network 120 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication interface. In some embodiments, the protocol is a custom protocol of JSON objects sent via a Websocket channel. In some embodiments, the protocol is JSON over RPC, JSON over REST/HTTP, and the like.

The server 140 may provide for receiving of electronic data from various sources, including but not necessarily limited to the devices 110A-110N. For example, the server 140 may be operable to receive and post or transmit data provided by the devices 110A-110N.

Devices 110A-110N and/or server 140 may each be implemented as a personal computer and/or other networked device, such as a cellular phone, tablet computer, mobile device, etc., that may be used for any suitable purpose in addition to fiducial marker alignment (e.g., fiducial marker tracking, electron tomography, etc.). The depiction in FIG. 1 of "N" users is merely for illustration purposes. Any number of users may be included in the system 100. In one embodiment, the devices 110A-110N may be configured to display an interface on a display of the client device for viewing, creating, editing, and/or otherwise interacting with data, which may be provided by the server 140. According to some embodiments, the server 140 may be configured to display the interface on a display of the server 140 for viewing, creating, editing, and/or otherwise interacting with data. The devices 110A-110N may be used in addition to or instead of the server 140. System 100 may also include additional devices and/or servers, among other things. Additionally or alternatively, the device 110A-110N may interact with system 100 via a web browser. As yet another example, the device 110A-110N may include various hardware or firmware designed to interface with the system 100.

The devices 110A-110N may be any computing device as defined above. Electronic data received by the server 140 from the devices 110A-110N may be provided in various forms and via various methods. For example, the devices 110A-110N may include desktop computers, laptop computers, smartphones, netbooks, tablet computers, wearables, and the like.

In embodiments where a device 110A-110N is a mobile device, such as a smart phone or tablet, the device 110A-110N may execute an "app" to interact with the system 100. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Figure 2:
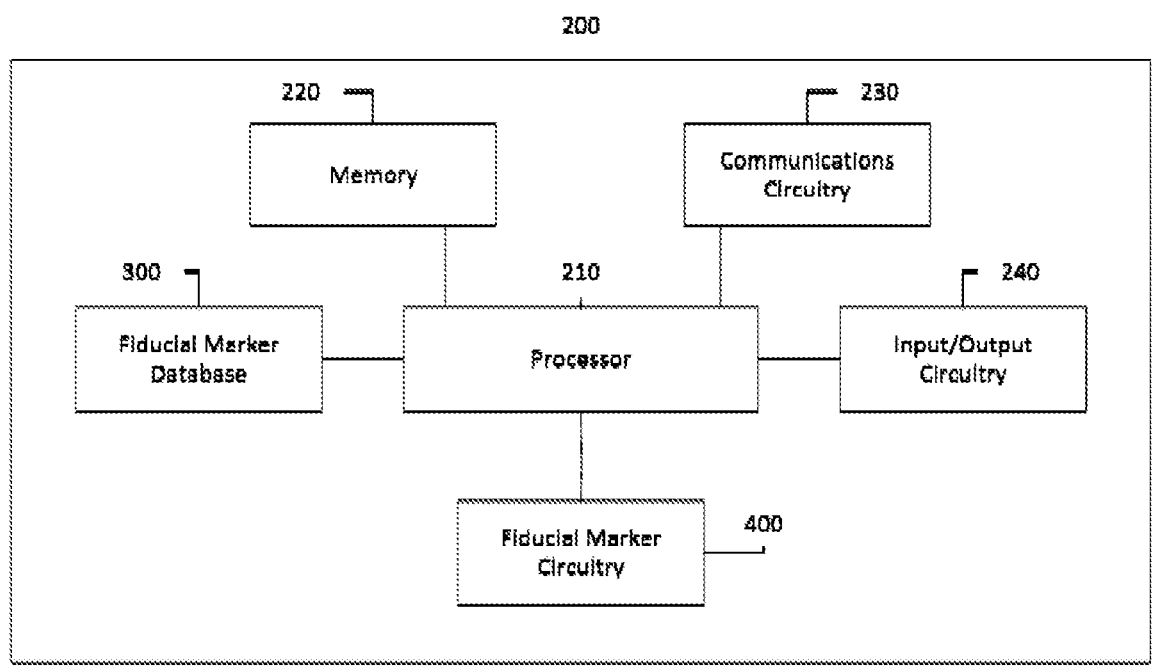
FIG. 2 illustrates a schematic block diagram of circuitry that can be included in an apparatus in accordance with some embodiments discussed herein.
Figure 3:
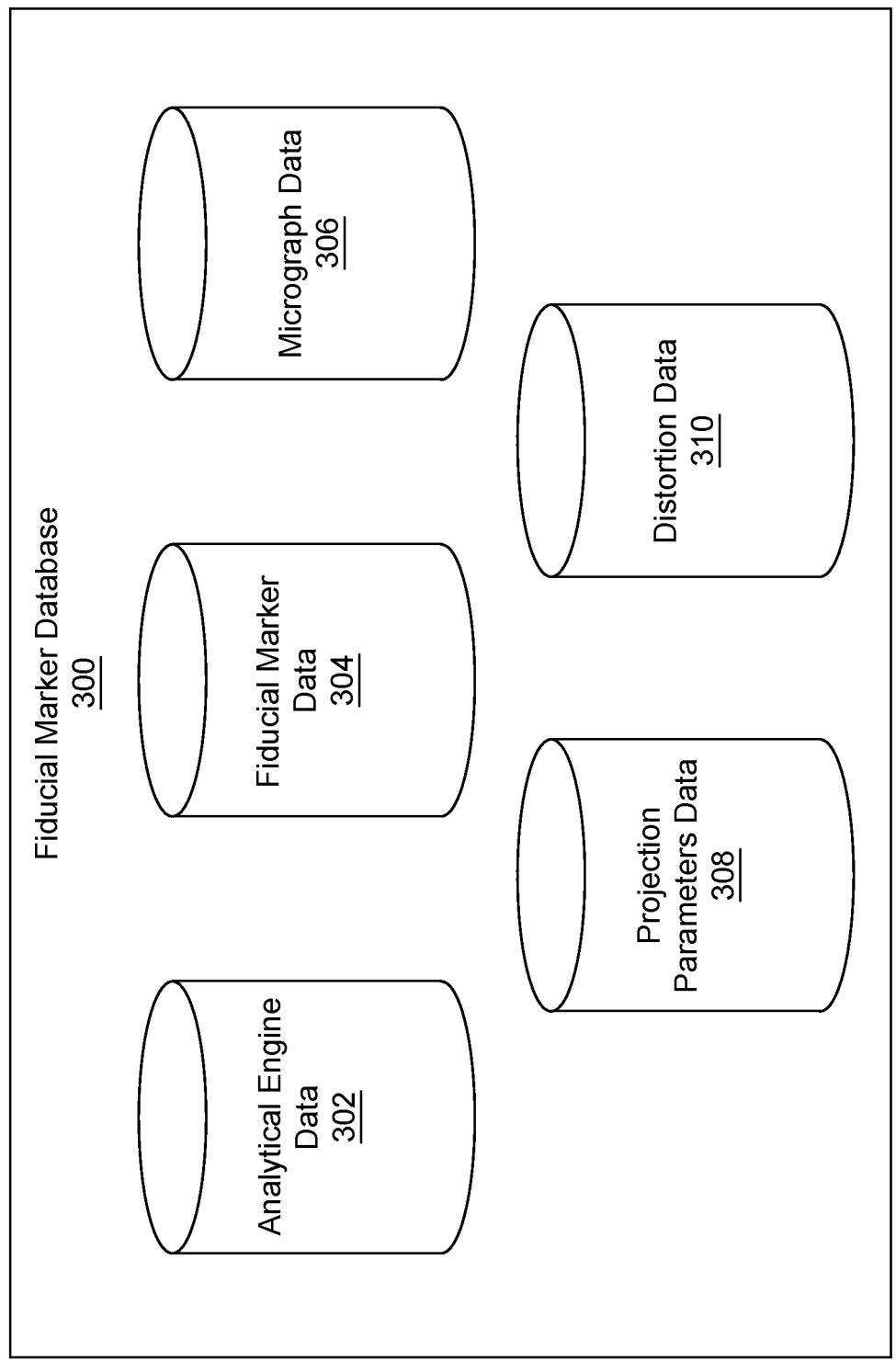
FIG. 3 illustrates an example fiducial marker database in accordance with some embodiments discussed herein.

FIG. 2 shows a schematic block diagram of an apparatus 200, some or all of the components of which may be included, in various embodiments, in one or more devices 110A-110N and server 140. Any number of systems or devices may include the components of apparatus 200 and may be configured to, either independently or jointly with other devices to perform the functionality of the apparatus 200 described herein resulting in a fiducial marker alignment device, fiducial marker tracking device, electron tomography device, or a combination thereof. As illustrated in FIG. 2, in accordance with some example embodiments, apparatus 200 can includes various means, such as processor 210, memory 220, communications circuitry 230, and/or input/output circuitry 240. In some embodiments, fiducial marker database 300 and/or fiducial marker circuitry 400 may also or instead be included. As referred to herein, "circuitry" includes hardware, or a combination of hardware with software configured to perform one or more particular functions. In this regard, the various components of apparatus 200 described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 220) that is executable by a suitably configured processing device (e.g., processor 210), or some combination thereof. In some embodiments, one or more of these circuitries may be hosted remotely (e.g., by one or more separate devices or one or more cloud servers) and thus need not reside on the data set device or user device. The functionality of one or more of these circuitries may be distributed across multiple computers across a network.

Processor 210 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments processor 210 comprises a plurality of processors. The plurality of processors may be embodied on a single computing device or may be distributed across a plurality of computing devices collectively configured to function as apparatus 200. The plurality of processors may be in operative communication with each other and may be collectively configured to perform one or more functionalities of apparatus 200 as described herein. In an example embodiment, processor 210 is configured to execute instructions stored in memory 220 or otherwise accessible to processor 210. These instructions, when executed by processor 210, may cause apparatus 200 to perform one or more of the functionalities as described herein.

Whether configured by hardware, or a combination of hardware with firmware/software methods, processor 210 may comprise an entity capable of performing operations according to embodiments of the present invention while configured accordingly. Thus, for example, when processor 210 is embodied as an ASIC, FPGA or the like, processor 210 may comprise the specifically configured hardware for conducting one or more operations described herein. Alternatively, as another example, when processor 210 is embodied as an executor of instructions, such as may be stored in memory 220, the instructions may specifically configure processor 210 to perform one or more algorithms and operations described herein, such as those discussed in connection with FIGS. 1-11.

Memory 220 may comprise, for example, volatile memory, non-volatile memory, or some combination thereof. Although illustrated in FIG. 2 as a single memory, memory 220 may comprise a plurality of memory components. The plurality of memory components may be embodied on a single computing device or distributed across a plurality of computing devices. In various embodiments, memory 220 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 220 may be configured to store information, data (including item data and/or profile data), applications, instructions, or the like for enabling apparatus 200 to carry out various functions in accordance with example embodiments of the present invention. For example, in at least some embodiments, memory 220 is configured to buffer input data for processing by processor 210. Additionally or alternatively, in at least some embodiments, memory 220 is configured to store program instructions for execution by processor 210. Memory 220 may store information in the form of static and/or dynamic information. This stored information may be stored and/or used by apparatus 200 during the course of performing its functionalities.

Communications circuitry 230 may be embodied as any device or means embodied in circuitry, hardware, a computer program product comprising computer readable program instructions stored on a computer readable medium (e.g., memory 220) and executed by a processing device (e.g., processor 210), or a combination thereof that is configured to receive and/or transmit data from/to another device and/or network, such as, for example, a second apparatus 200 and/or the like. In some embodiments, communications circuitry 230 (like other components discussed herein) can be at least partially embodied as or otherwise controlled by processor 210. In this regard, communications circuitry 230 may be in communication with processor 210, such as via a bus. Communications circuitry 230 may include, for example, an antenna, a transmitter, a receiver, a transceiver, network interface card and/or supporting hardware and/or firmware/software for enabling communications with another computing device. Communications circuitry 230 may be configured to receive and/or transmit any data that may be stored by memory 220 using any protocol that may be used for communications between computing devices. Communications circuitry 230 may additionally or alternatively be in communication with the memory 220, input/output circuitry 240 and/or any other component of apparatus 200, such as via a bus.

Input/output circuitry 240 may be in communication with processor 210 to receive an indication of a user input and/or to provide an audible, visual, mechanical, or other output to a user (e.g., provider and/or consumer). Some example visual outputs that may be provided to a user by apparatus 200 are discussed in connection with FIGS. 5a-10b. As such, input/output circuitry 240 may include support, for example, for a keyboard, a mouse, a joystick, a display, a touch screen display, a microphone, a speaker, a RFID reader, barcode reader, biometric scanner, and/or other input/output mechanisms. In embodiments wherein apparatus 200 is embodied as a server or database, aspects of input/output circuitry 240 may be reduced as compared to embodiments where apparatus 200 is implemented as an end-user machine (e.g., lab payer device and/or provider device) or other type of device designed for complex user interactions. In some embodiments (like other components discussed herein), input/output circuitry 240 may even be eliminated from apparatus 200. Alternatively, such as in embodiments wherein apparatus 200 is embodied as a server or database, at least some aspects of input/output circuitry 240 may be embodied on an apparatus used by a user that is in communication with apparatus 200. Input/output circuitry 240 may be in communication with the memory 220, communications circuitry 230, and/or any other component(s), such as via a bus. One or more than one input/output circuitry and/or other component can be included in apparatus 200.

Fiducial marker database 300 and fiducial marker circuitry 400 may also or instead be included and configured to perform the functionality discussed herein related to storing, generating, and/or editing data. In some embodiments, some or all of the functionality of these components of the apparatus 200 may be performed by processor 210, although in some embodiments, these components may include distinct hardware circuitry designed to perform their respective functions. In this regard, the example processes and algorithms discussed herein can be performed by at least one processor 210, fiducial marker database 300, and/or fiducial marker circuitry 400. For example, non-transitory computer readable media can be configured to store firmware, one or more application programs, and/or other software, which include instructions and other computer-readable program code portions that can be executed to control each processor (e.g., processor 210, fiducial marker database 300, and fiducial marker circuitry 400) of the components of apparatus 200 to implement various operations, including the examples shown above. As such, a series of computer-readable program code portions are embodied in one or more computer program goods and can be used, with a computing device, server, and/or other programmable apparatus, to produce machine-implemented processes.

In some embodiments, the fiducial marker database 300 (see FIG. 3) may store fiducial marker data 304, micrograph data 306, projection parameters data 308, distortion data 310, and/or analytical engine data 302. In some embodiments, the fiducial marker database 300 may also include fiducial marker detection data and/or parameter optimization data and any other fiducial marker alignment data beyond that contained in the fiducial marker database 300 illustrated in FIG. 3. For instance, when the apparatus 200 is a fiducial marker tracking device, electron tomography device, or a combination thereof, fiducial marker detection data and/or parameter optimization data and any other fiducial marker alignment data may be included in the fiducial marker database 300. In some embodiments, the fiducial marker database 300 may also include reproduction data and/or reconstruction data and any other electron tomography data beyond that contained in the fiducial marker database 300 illustrated in FIG. 3. For instance, when the apparatus 200 is an electron tomography device, reproduction data and/or reconstruction data and any other electron tomography data may be included in the fiducial marker database 300.

Fiducial marker data 304 may include various information associated with a fiducial marker, such as the coordinates of the location of a fiducial marker. Various point sets of fiducial markers may be stored in the fiducial marker data 304 and various matched and unmatched fiducial markers may be stored in the fiducial marker data 304. Micrograph data 306 may include various properties or characteristics of a micrograph and may be associated with fiducial markers and fiducial marker data 304. For instance, the micrograph data 306 may include the tilt angle for each micrograph and tilt angle intervals for various combinations of micrographs. Projection parameter data 308 may include various parameters associated with the projection of a sample containing fiducial markers and may be associated with micrographs via micrograph data 306, fiducial markers via fiducial marker data 304, or combinations thereof. Distortion data 310 may include determine distortions associated with micrographs and/or fiducial markers. The various data may be retrieved from any of a variety of sources, such as any device that may interact with the apparatus 200.

Additionally or alternatively, the fiducial marker database 300 may include analytical engine data 302 which provides any additional information needed by the processor 210 in analyzing and generating data.

Overlap among the data obtained by the fiducial marker database 300 among the fiducial marker data 304, micrograph data 306, projection parameters data 308, distortion data 310, and/or analytical engine data 302 may occur and information from one or more of these databases may be retrieved from any device that may interact with the apparatus 200, such as a client device operated by a user. As new data is obtained by the apparatus 200, such data may be retained in the fiducial marker database 300 in one or more of the fiducial marker data 304, micrograph data 306, projection parameters data 308, distortion data 310, and/or analytical engine data 302.

Fiducial marker circuitry 400 can be configured to analyze multiple sets of fiducial markers, micrographs, projection parameters, distortions, as discussed herein and combinations thereof, such as any combination of the data in the fiducial marker database 300, for fiducial marker tracking, fiducial marker alignment, and/or electron tomography. In this way, fiducial marker circuitry 400 may execute multiple algorithms, including those discussed below with respect to the fiducial marker system 100.

Figure 4:
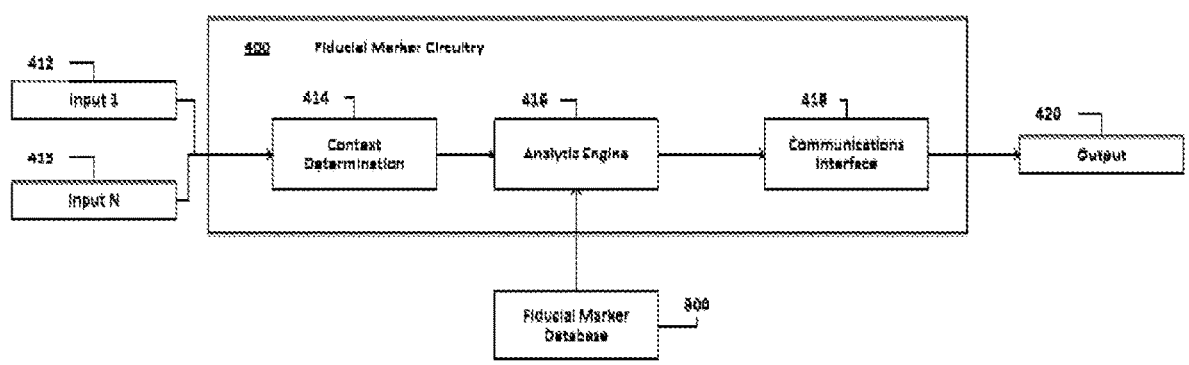
FIG. 4 illustrates example fiducial marker circuitry in accordance with some embodiments discussed herein.

In some embodiments, with reference to FIG. 4, the fiducial marker circuitry 400 may include a context determination circuitry 414, an analytical engine 416, and communications interface 418, all of which may be in communication with the fiducial marker database 300. In some embodiments, the context determination module 414 may be implemented using one or more of the components of apparatus 200. For instance, the context determination module 414 may be implemented using one or more of the processor 210, memory 220, communications circuitry 230, and input/output circuitry 240. For instance, the context determination module 414 may be implemented using one or more of the processor 210 and memory 220. The analytical engine 416 may be implemented using one or more of the processor 210, memory 220, communications circuitry 230, and input/output circuitry 240. For instance, the analytical engine 416 may be implemented using one or more of the processor 210 and memory 220. The communications interface 418 may be implemented using one or more of the processor 210, memory 220, communications circuitry 230, and input/output circuitry 240. For instance, the communications interface 418 may be implemented using one or more of the communications circuitry 230 and input/output circuitry 240.

The fiducial marker circuitry 400 may receive one or more fiducial markers, micrographs, projection parameters, distortions, as discussed herein and combinations thereof and may generate the appropriate response as will be discussed herein (see e.g., FIG. 12). The fiducial marker circuitry 400 may use any of the algorithms or processes disclosed herein for receiving any of the fiducial markers, micrographs, projection parameters, distortions, etc. discussed herein and generating the appropriate response. In some other embodiments, such as when the apparatus 200 is embodied in a server and/or devices, the fiducial marker circuitry 400 may be located in another apparatus 200 or another device, such as another server and/or devices.

The system may receive a plurality of inputs 412, 415 from the apparatus 200 and process the inputs within the fiducial marker circuitry 400 to produce an output 420, which may include appropriate transformed unmatched fiducial markers, matched fiducial markers, projection parameters, distortions, etc. in response. In some embodiments, the fiducial marker circuitry 400 may execute context determination using the context determination circuitry 414, process the communication and/or data in an analytical engine 416, and output the results via a communications interface 418. Each of these steps may retrieve data from a variety of sources including the fiducial marker database 300.

When inputs 412, 415 are received by the fiducial marker circuitry 400, the context determination circuitry 414 may make a context determination regarding the communication. A context determination includes such information as when and what user initiated generation of the input (e.g., when and who selected the actuator that initiated the transformation), what type of input was provided (e.g., fiducial markers, micrographs, projection parameters, distortions, tilt angles, etc.) and under what circumstances receipt of the input was initiated (e.g., previous input provided, data currently retained by the fiducial marker database 300, etc.). This information may give context to the fiducial marker circuitry 400 analysis for subsequent determinations. For example, the context determination circuitry 414 may inform the fiducial marker circuitry 400 as to the communication content to output.

The fiducial marker circuitry 400 may then compute the output using the analytical engine 416. The analytical engine 416 draws the applicable data from the fiducial marker database 300 and then, based on the context determination made by the context determination circuitry 414, computes an output, which may vary based on the input. The communications interface 418 then outputs the output 420 to the apparatus 200 for display on the appropriate device. For instance, the context determination circuitry 414 may determine that certain fiducial markers or micrographs were obtained. Based on this information as well as the applicable data from the fiducial marker database 300 (e.g., additional fiducial markers, micrographs, projection parameters, distortions, etc.), the analytical engine 416 may determine an appropriate output 420, such as transformed fiducial markers, matched fiducial markers, projection parameters, distortions, etc. The analytical engine 416 may also determine that certain data in the fiducial marker database 300 should be updated to reflect the new information contained in the received input.

The apparatus 200 may include any suitable network server and/or other type of processing device. The fiducial marker database 300 may be embodied as a data storage device such as a Network Attached Storage (NAS) device or devices, as a separate database server or servers (e.g., cloud computing), or distributed across multiple devices in a network (e.g., blockchain). The fiducial marker database 300 stores information for the apparatus 200 to facilitate the operations. For example, the fiducial marker database 300 may include, without limitation, a plurality of data regarding fiducial markers, micrographs, projection parameters, distortions, etc., organized within the fiducial marker database 300.

Apparatus 200 may be included in any computing device as defined above. Electronic data received by the apparatus 200 may be provided in various forms and via various methods.

In some embodiments of an exemplary system, fiducial marker data, micrograph data, projection parameters data, distortions data, etc. may be sent from a user (via a client device) to apparatus 200. In various implementations, fiducial marker data, micrograph data, projection parameters data, distortions data, etc. may be sent directly to the apparatus 200 (e.g., via a peer-to-peer connection) or over a network, in which case the fiducial marker data, micrograph data, projection parameters data, distortions data, etc. may in some embodiments be transmitted via an intermediary such as a message server, and/or the like.

In one implementation, the fiducial marker data, micrograph data, projection parameters data, distortions data, etc. may be parsed by the apparatus 200 to identify various components included therein. Parsing of the fiducial marker data, micrograph data, projection parameters data, distortions data, etc. may facilitate determination by the apparatus 200 of the user who sent the information and/or to the contents of the information and to what or whom the information relates. Machine learning techniques may be used.

In embodiments, the contents of the fiducial marker data, micrograph data, projection parameters data, distortions data, etc. may be used to index the respective information to facilitate various facets of searching (i.e., search queries that return results from fiducial marker database 300).

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example devices and systems discussed herein can be based on data that is received, generated and/or maintained by one or more components of a local or networked system and/or apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Operations

Marker-based alignment may include three stages: (i) fiducial marker detection, (ii) fiducial marker tracking and (iii) parameter optimization. In some embodiments, the apparatus 200 may include fiducial marker detection and parameter optimization. In some embodiments, apparatus 200 may be an electron tomography apparatus.

Provided herein, the relationship between a 2D model-based tracking and the 3D projection model is demonstrated. An upper bound of the deviation may be provided, within which the fiducial markers may be tracked in an affine transformation constrained model. Also provided is a series of solutions to allow for fiducial marker tracking.

Affine Relationship of Two Micrographs

In some embodiments, the projection is modeled as an affine or orthogonal projection. A classic orthogonal model is described as follows (in this section, the bold font is used to indicate vectors or matrices; a 2D point is represented by a 2×1 vector):

$$\begin{pmatrix} u \\ v \end{pmatrix} = sR_\gamma PR_\beta R_\alpha \begin{pmatrix} X \\ Y \\ Z \end{pmatrix} + t, \quad (1)$$

where $(X, Y, Z)^T$ is the spatial location of the ultrastructure or fiducial markers, s is the image scale change, y is the inplane rotation angle, $\alpha$ is the pitch angle of the tilt axis of the projection, $\beta$ is the tilt angle of the sample, $t=(t_0, t_1)^T$ is the translation of the view, $(u, v)^T$ is the measured projection point and P denotes the orthogonal projection matrix. $R_\alpha, R_\beta, P$ and $R_\gamma$ are defined as follows:

$$R_\alpha = \begin{pmatrix} 1 & 0 & 0 \\ 0 & \cos\alpha & \sin\alpha \\ 0 & -\sin\alpha & \cos\alpha \end{pmatrix},$$

$$R_\beta = \begin{pmatrix} \cos\beta & 0 & -\sin\beta \\ 0 & 1 & 0 \\ \sin\beta & 0 & \cos\beta \end{pmatrix},$$

$$P = \begin{pmatrix} 1 & 0 & 0 \\ 0 & 1 & 0 \end{pmatrix},$$

$$R_\gamma = \begin{pmatrix} \cos\gamma & \sin\gamma \\ -\sin\gamma & \cos\gamma \end{pmatrix}.$$

For two micrographs, a single transformation that aligns all the corresponding fiducial markers within a limited deviation may be prepared. Provided herein is a Lemma that theoretically provides the upper bound of deviation on any arbitrary fiducial marker. The Lemma may be used to prove a Theorem which guarantees the upper bound over all the fiducial markers.

Lemma: With a fixed pitch angle during tilt, for any arbitrary fiducial marker $(X_j, Y_j, Z_j)^T$ and its arbitrary two projections (denoted as $p_{ij}$ and $p_{i'j}$), there may be a transformation A and t (Eq.(11) and Eq.(12)) that is independent of j (Eq. 3 and Eq. 4) that can be applied to this fiducial marker ($p'_{ij}=Ap_{ij}+t$) to make the deviation $$\|\Delta_j\| = \|p'_{ij} - p_{i'j}\| \le s_{i'} \left| \frac{\sin\Delta\beta}{\cos\alpha\cos\beta_i} (Z_j - Z_\mu) \right|,$$

where $\alpha$ is the fixed pitch angle; $s_i'$ is the scale change of the i'th micrograph; $\beta_i$ and $\beta_{i'}$ are the tilt angles of the corresponding projections; $\Delta\beta=\beta_{i'}-\beta_i$ and $$Z_\mu = \frac{1}{N} \sum_{j=1}^{N} Z_j.$$

A transformation may be constructed and the deviation of this transformation may $$\text{be } s_{i'} \left| \frac{\sin\Delta\beta}{\cos\alpha\cos\beta_i} (Z_j - Z_\mu) \right|.$$

Therefore, the optimal transformation may be upper bounded by this value.

By substituting P, $R_\beta$ and $R_\alpha$ into Eq.(1), the orthogonal projection can be rewritten as:

$$\begin{pmatrix} u \\ v \end{pmatrix} = sR_\gamma \begin{pmatrix} \cos\beta & \sin\alpha\sin\beta \\ 0 & \cos\alpha \end{pmatrix}\begin{pmatrix} X \\ Y \end{pmatrix} + sR_\gamma \begin{pmatrix} -\sin\beta\cos\alpha \\ \sin\alpha \end{pmatrix} Z + \begin{pmatrix} t_0 \\ t_1 \end{pmatrix}, \quad (2)$$

$\{(X, Y, Z)^T\}$ may be the fiducial markers embedded in the specimen. Considering the jth fiducial marker $(X_j, Y_j, Z_j)^T$ (j=1, 2, . . . , N), its projections in the ith and i'th views $(p_{ij}=(u_{ij}, v_{ij})^T$ and $(p_{i'j}=u_{i'j}, v_{i'j})^T)$ can be written as:

$$\begin{pmatrix} u_{ij} \\ v_{ij} \end{pmatrix} = \quad (3)$$

$$s_i R_{\gamma_i} \begin{pmatrix} \cos\beta_i & \sin\alpha_i\sin\beta_i \\ 0 & \cos\alpha_i \end{pmatrix}\begin{pmatrix} X_j \\ Y_j \end{pmatrix} + s_i R_{\gamma_i} \begin{pmatrix} -\sin\beta_i\cos\alpha_i \\ \sin\alpha_i \end{pmatrix} Z_j + t_i,$$

$$\begin{pmatrix} u_{i'j} \\ v_{i'j} \end{pmatrix} = s_{i'} R_{\gamma_{i'}} \begin{pmatrix} \cos\beta_{i'} & \sin\alpha_{i'}\sin\beta_{i'} \\ 0 & \cos\alpha_{i'} \end{pmatrix}\begin{pmatrix} X_j \\ Y_j \end{pmatrix} +$$

$$s_{i'} R_{\gamma_{i'}} \begin{pmatrix} -\sin\beta_{i'}\cos\alpha_{i'} \\ \sin\alpha_{i'} \end{pmatrix} Z_j + t_{i'}.$$

Considering a transformation $T(\bullet; A_{ii'j}, t_{ii'j})$ that makes $p'_{ij} = A_{ii'j} p_{ij} + t_{ii'j}$, the deviation between $p'_{ij}$ and $p_{i'j}$ can be derived as following:

$$\Delta_j = p'_{ij} - p_{i'j}$$

$$= \left[ A_{ii'j} \left[ s_i R_{\gamma_i} \begin{pmatrix} \cos\beta_i & \sin\alpha_i\sin\beta_i \\ 0 & \cos\alpha_i \end{pmatrix}\begin{pmatrix} X_j \\ Y_j \end{pmatrix} + \right. \right.$$

$$\left. s_i R_{\gamma_i} \begin{pmatrix} -\sin\beta_i\cos\alpha_i \\ \sin\alpha_i \end{pmatrix} Z_j + t_i \right] + t_{ii'j} \right] -$$

$$- \left[ s_{i'} R_{\gamma_{i'}} \begin{pmatrix} \cos\beta_{i'} & \sin\alpha_{i'}\sin\beta_{i'} \\ 0 & \cos\alpha_{i'} \end{pmatrix}\begin{pmatrix} X_j \\ Y_j \end{pmatrix} + \right.$$

$$\left. s_{i'} R_{\gamma_{i'}} \begin{pmatrix} -\sin\beta_{i'}\cos\alpha_{i'} \\ \sin\alpha_{i'} \end{pmatrix} Z_j + t_{i'} \right]$$

$$= \left[ A_{ii'j} s_i R_{\gamma_i} \begin{pmatrix} \cos\beta_i & \sin\alpha_i\sin\beta_i \\ 0 & \cos\alpha_i \end{pmatrix} - \right.$$

$$\left. s_{i'} R_{\gamma_{i'}} \begin{pmatrix} \cos\beta_{i'} & \sin\alpha_{i'}\sin\beta_{i'} \\ 0 & \cos\alpha_{i'} \end{pmatrix} \right] \begin{pmatrix} X_j \\ Y_j \end{pmatrix} +$$

$$\left[ A_{ii'j} s_i R_{\gamma_i} \begin{pmatrix} -\sin\beta_i\cos\alpha_i \\ \sin\alpha_i \end{pmatrix} - s_{i'} R_{\gamma_{i'}} \begin{pmatrix} -\sin\beta_{i'}\cos\alpha_{i'} \\ \sin\alpha_{i'} \end{pmatrix} \right] Z_j +$$

$$A_{ii'j} t_i + t_{ii'j} - t_{i'}.$$

A transformation to minimize the total deviation of the corresponding fiducial marker projections in the ith and i'th views may be determined, i.e., a single $T(\bullet; A, t)$ that is applied to $\{\Delta_j, j=1, \ldots N\}$ to minimize $\Sigma_{j=1}^N \|\Delta_j\|$.

In some embodiments, the specimens may have a relatively small thickness z but large x-y dimensions. For example, the values for x and y may be 1024, 2048 and 4096, whereas that for z may be 50, 100 and 150. Therefore, a transformation $A_{ii'j}$ to make $\Delta_j$ independent of $X_j$ and $Y_j$ may be constructed:

$$A_{ii'j} s_i R_{\gamma_i} \begin{pmatrix} \cos\beta_i & \sin\alpha_i\sin\beta_i \\ 0 & \cos\alpha_i \end{pmatrix} - s_{i'} R_{\gamma_{i'}} \begin{pmatrix} \cos\beta_{i'} & \sin\alpha_{i'}\sin\beta_{i'} \\ 0 & \cos\alpha_{i'} \end{pmatrix} = 0, \quad (4)$$

from which $A_{ii'j}$ can be solved as $$A_{ii'j} = \frac{s_{i'}}{s_i} R_{\gamma_{i'}} \begin{pmatrix} \cos\beta_{i'} & \sin\alpha_{i'}\sin\beta_{i'} \\ 0 & \cos\alpha_{i'} \end{pmatrix} \begin{pmatrix} \frac{1}{\cos\beta_i} & \frac{-\sin\alpha_i\sin\beta_i}{\cos\alpha_i\cos\beta_i} \\ 0 & \frac{1}{\cos\alpha_i} \end{pmatrix} R_{-\gamma_i}. \quad (5)$$

Furthermore, if $$A_{ii'j} t_i + t_{ii'j} - t_{i'}, \text{ as } T_j, \text{ i.e. } t_{ii'j} = t_{i'} - A_{ii'j} t_i + T_j, \quad (6)$$

the expression of $\Delta_j$ can be reduced to $$\Delta_j = \left[ A_{ii'j} s_i R_{\gamma_i} \begin{pmatrix} -\sin\beta_i\cos\alpha_i \\ \sin\alpha_i \end{pmatrix} - s_{i'} R_{\gamma_{i'}} \begin{pmatrix} -\sin\beta_{i'}\cos\alpha_{i'} \\ \sin\alpha_{i'} \end{pmatrix} \right] Z_j + T_j = \quad (7)$$

$$s_i R_{\gamma_i} \left[ \begin{pmatrix} \cos\beta_{i'} & \sin\alpha_{i'}\sin\beta_{i'} \\ 0 & \cos\alpha_{i'} \end{pmatrix} \begin{pmatrix} \frac{1}{\cos\beta_i} & \frac{-\sin\alpha_i\sin\beta_i}{\cos\alpha_i\cos\beta_i} \\ 0 & \frac{1}{\cos\alpha_i} \end{pmatrix} \right.$$

$$\left. \begin{pmatrix} -\sin\beta_i\cos\alpha_i \\ \sin\alpha_i \end{pmatrix} - \begin{pmatrix} -\sin\beta_{i'}\cos\alpha_{i'} \\ \sin\alpha_{i'} \end{pmatrix} \right]$$

$$Z_j + T_j = s_{i'} R_{\gamma_{i'}} \begin{pmatrix} \Delta u \\ \Delta v \end{pmatrix} Z_j + T_j.$$

in which $$\Delta u = -\frac{\cos\beta_{i'}\sin\beta_i\cos\alpha_i}{\cos\beta_i} - \quad (8)$$

$$\frac{(\sin\alpha_i)^2 \sin\beta_i\cos\beta_{i'}}{\cos\alpha_i\cos\beta_i} + \frac{\sin\alpha_{i'}\sin\beta_{i'}\sin\alpha_i}{\cos\alpha_i} + \sin\beta_{i'}\cos\alpha_{i'},$$

$$\Delta v = \frac{\cos\alpha_{i'}\sin\alpha_i - \sin\alpha_{i'}\cos\alpha_i}{\cos\alpha_i} = \frac{\sin(\alpha_i - \alpha_{i'})}{\cos\alpha_i}.$$

The construction of $A_{ii'j}$ and $t_{ii'j}$ may be independent of j. Therefore, in some embodiments, for all the fiducial markers, $A_{ii'j}$ and $t_{ii'j}$ are identical. By further denoting $A_{ii'j}$ as A and denoting $t_{ii'j}$ (assuming the freedom parameter $T_j$ are identical for all the j and the value is T), the goal may be to find such T to make the transformation T(; A, t) minimize $\Sigma_{j=1}^N \|\Delta_j\|$ for $\{(X, Y, Z)^T\}$:

$$COST = \sum_{j=1}^N \|\Delta_j\| = \sum_{j=1}^N \left\| s_{i'} R_{\gamma_{i'}} \begin{pmatrix} \Delta u \\ \Delta v \end{pmatrix} Z_j + T \right\| \quad (9)$$

Let $w = s_{i'} R_{\gamma_{i'}} (\Delta u, \Delta v)^T$, and we can find that all the $Z_j$ have the coefficient w. By writing T as T=wl, the cost function is derived as:

$$COST = \|w\| \Sigma_{j=1}^N \|Z_j + l\| \quad (10)$$

It becomes a 1-dimensional cluster problem and the optimal solution may be $$l = -Z_\mu = -\frac{1}{N}\sum_{j=1}^{N} Z_j.$$

Therefore, the optimal solution for $T(\bullet; A, t)$ may become $$A = \frac{s_{i'}}{s_i} R_{\gamma_{i'}} \begin{pmatrix} \cos\beta_{i'} & \sin\alpha_{i'}\sin\beta_{i'} \\ 0 & \cos\alpha_{i'} \end{pmatrix} \begin{pmatrix} \frac{1}{\cos\beta_i} & \frac{-\sin\alpha_i\sin\beta_i}{\cos\alpha_i\cos\beta_i} \\ 0 & \frac{1}{\cos\alpha_i} \end{pmatrix} R_{-\gamma_i} \quad (11)$$

And $$t = t_{i'} - At_i - wZ_\mu, \quad (12)$$

where $w = s_i R_{\gamma_i}(\Delta u, \Delta v)^T$, $Z_\mu = 1/N \sum_{j=1}^{N} Z_j$. In some embodiments, the micrographs are taken with the pitch angle fixed, which means that $\alpha_i \approx \alpha_{i'}$. Suppose $\alpha_i = \alpha_{i'} = \alpha$, and let $\beta_{i'} - \beta_i = \Delta\beta$, $\Delta u$ and $\Delta v$ can be rewritten as:

$$\Delta u = \frac{\sin\alpha^2}{\cos\alpha} \cdot \left(\frac{\sin\beta_{i'} \cdot \cos\beta_i - \cos\beta_{i'} \cdot \sin\beta_i}{\cos\beta_i}\right) + \quad (13)$$

$$\frac{\cos\alpha^2}{\cos\alpha} \cdot \left(\frac{\sin\beta_{i'} \cdot \cos\beta_i - \cos\beta_{i'} \cdot \sin\beta_i}{\cos\beta_i}\right)$$

$$= \frac{\sin\alpha^2 + \cos\alpha^2}{\cos\alpha} \cdot \left(\frac{\sin(\beta_{i'} - \beta_i)}{\cos\beta_i}\right) = \frac{\sin\Delta\beta}{\cos\alpha \cdot \cos\beta_i},$$

$$\Delta v = \frac{\sin(\alpha - \alpha)}{\cos\alpha} = 0$$

The deviation $\Delta_j$ can be denoted as $$\Delta_j = s_{i'} R_{\gamma_{i'}} \begin{pmatrix} \frac{\sin\Delta\beta}{\cos\alpha\cos\beta_i} \\ 0 \end{pmatrix} (Z_j - Z_\mu). \quad (14)$$

By calculating the norm of $\|\Delta_j\|$, $\|\Delta_j\| = s_{i'} \|R_{\gamma_{i'}}\|$ $$\left|\frac{\sin\Delta\beta}{\cos\alpha\cos\beta_i}(Z_j - Z_\mu)\right| = s_{i'} \left|\frac{\sin\Delta\beta}{\cos\alpha\cos\beta_i}(Z_j - Z_\mu)\right|.$$

Since the transformation in Eq.(11) and Eq.(12) may always exist, and is just one of all the possible transformations, the deviation of the optimal transformation may be upper bounded by $$s_{i'} \left|\frac{\sin\Delta\beta}{\cos\alpha\cos\beta_i}(Z_j - Z_\mu)\right|.$$

In some embodiments, s' is around 1; the value of the tilt angle $\beta$ may be between −60 and 60% and the pitch angle $\alpha$ may be between −5 and 5°. Therefore, the value of $\|\Delta t\|$ may be not more than $2s_{i'} \sin\Delta\beta(Z_j - Z_\mu)$. If all the fiducial markers are located on one surface of the specimen, $Z_j - Z_\mu$ may be very small (e.g., almost equal to zero). In this case, the distributions of the fiducial markers on different projections may be constrained by the affine transformation between two arbitrary micrographs in the tilt series. If the fiducial markers are located on two surfaces of the specimen, $Z_j - Z_\mu$, may not be more than half of the thickness of the specimen (denoted as T). If a large tilt angle offset occurs, a coordinate transformation may be applied to the system to keep the fiducial markers horizontal.

Figure 13:
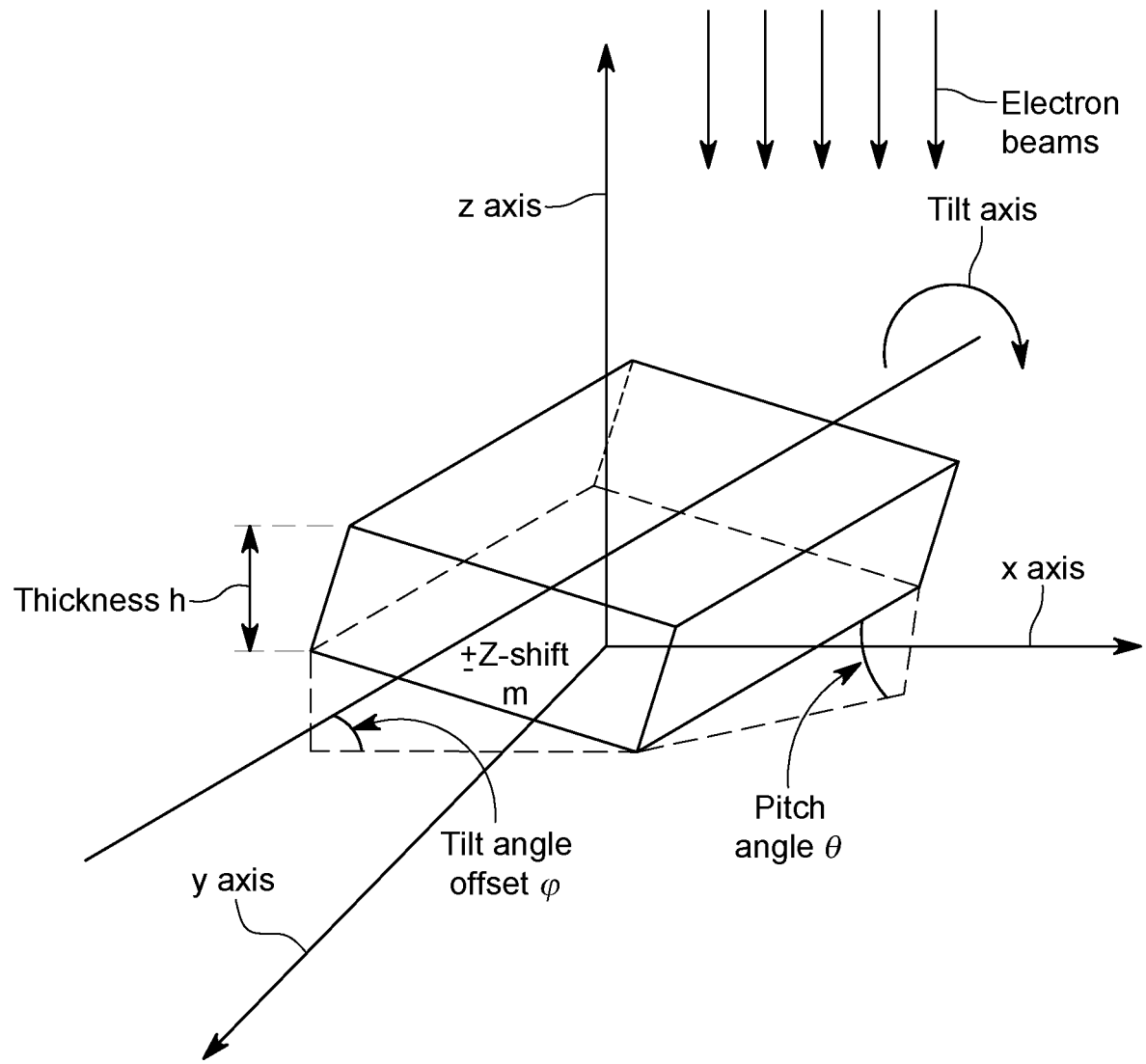
FIG. 13 illustrates an example of geometric parameters in accordance with some embodiments discussed herein.

A more general case is to consider the geometric model, in which the pitch angle and offset may both be considered (Eq.(1) only considers the pitch angle, which implicitly assumes that the tomogram is flat and horizontal to the x-y plane). FIG. 13 illustrates an example of geometric parameters. The introduction of tilt angle offset ($\varphi$) will enlarge the deviation of $Z_j - Z_\mu$. If the tilt angle offset is taken into consideration, the horizontal assumption may not be needed. In this condition, the projection model can be generalized to:

$$\begin{pmatrix} u \\ v \end{pmatrix} = sR_\gamma PR_\beta R_\alpha R_\varphi \begin{pmatrix} X \\ Y \\ Z \end{pmatrix} + t, \quad (15)$$

where all the attributes are the sample as in Eq. (1) except for $R_\varphi$ $$R_\varphi = \begin{pmatrix} \cos\varphi & 0 & -\sin\varphi \\ 0 & 1 & 0 \\ \sin\varphi & 0 & \cos\varphi \end{pmatrix} \quad (16)$$

In this case, the projection model can be rewritten as:

$$\begin{pmatrix} u \\ v \end{pmatrix} = sR_\gamma \begin{pmatrix} \cos\beta\cos\varphi - \cos\alpha\sin\beta\sin\varphi & \sin\alpha\sin\beta \\ \sin\alpha\sin\varphi & \cos\alpha \end{pmatrix} \begin{pmatrix} X \\ Y \end{pmatrix} + \quad (17)$$

$$sR_\gamma \begin{pmatrix} -\cos\beta\sin\varphi - \sin\beta\cos\alpha\cos\varphi \\ \sin\alpha\cos\varphi \end{pmatrix} Z + \begin{pmatrix} t_0 \\ t_1 \end{pmatrix}$$

Denote $$T = \begin{pmatrix} \cos\beta\cos\varphi - \cos\alpha\sin\beta\sin\varphi & \sin\alpha\sin\beta \\ \sin\alpha\sin\varphi & \cos\alpha \end{pmatrix}, \text{ and} \quad (18)$$

$$V = \begin{pmatrix} -\cos\beta\sin\varphi - \sin\beta\cos\alpha\cos\varphi \\ \sin\alpha\cos\varphi \end{pmatrix}. \quad (19)$$

Then let $\{(X, Y, Z)^T\}$ be the fiducial markers embedded in the specimen. Considering the jth fiducial marker $(X_j, Y_j, Z_j)^T$ (j=1, 2, ..., N), its projections in the ith and i'th views $(p_{ij} = (u_{ji}, v_{ij})^T$ and $(p_{i'j} = u_{i'j}, v_{i'j})^T)$ can be written as:

$$\begin{pmatrix} u_{ij} \\ v_{ij} \end{pmatrix} = s_i R_{\gamma_i} T_i \begin{pmatrix} X_j \\ Y_j \end{pmatrix} + s_i R_{\gamma_i} V_i Z_j + t_i, \quad (20)$$

$$\begin{pmatrix} u_{i'j} \\ v_{i'j} \end{pmatrix} = s_{i'} R_{\gamma_{i'}} T_{i'} \begin{pmatrix} X_j \\ Y_j \end{pmatrix} + s_{i'} R_{\gamma_{i'}} V_{i'} Z_j + t_{i'}.$$

A transformation $T(\bullet; A_{ii'j}, t_{ii'j})$, can be found where $$A_{ii'j} = \frac{s_{i'}}{s_i} R_{\gamma_{i'}} T_{i'} T_i^{-1} R_{-\gamma_i}, t_{ii'j} = t_{i'} - A_{ii'j} t_i + T_j, \quad (21)$$

that satisfies $p'_{ij} = A_{ii'j} p_{ij} + t_{ii'j}$ and makes $$\Delta_j = wZ_j + T_j; w = s_i R_{\gamma_i} (T_i T_i^{-1} V_i - V_{i'}). \quad (22)$$

Similarly, since $A_{ii'j}$ and $t_{ii'j}$ may be independent of specific fiducial markers, for all the fiducial markers, they may be identical. By further denoting $A_{ii'j}$ as A and denoting $t_{ii'j}$ as t (assuming the freedom parameter $T_j$ for all the markers are identical and the value is T), T to make the transformation $T(\bullet; A, t)$ minimize $\Sigma_{j=1}^{N} \|\Delta_j\|$ for $\{(X, Y, Z)^T\}$ can be found:

$$COST = \Sigma_{j=1}^{N} \|\Delta_j\| = \Sigma_{j=1}^{N} \|wZ_j + T\|. \quad (23)$$

Here, the optimal solution may be $$T = -wZ_\mu, Z_\mu = \frac{1}{N}\sum_{j=1}^{N} Z_j.$$

The offset-considered solution may have the same form above, in which the optimal transformation $T(\bullet; A, t)$ is $$A = \frac{s_{i'}}{s_i} R_{\gamma_{i'}} T_{i'} T_i^{-1} R_{-\gamma_i}, \quad (24)$$

$$t = t_{i'} - A_{ii'j} t_i - wZ_\mu,$$

where $w = s_i R_{\gamma_{i'}} (T_{i'} T_i^{-1} V_i - V_{i'})$, $$Z_\mu = \frac{1}{N}\sum_{j=1}^{N} Z_j.$$

The pitch angle may be assumed stable (i.e., $\alpha_i = \alpha_{i'}$).

Considering the expression of T and V (Eq.(18) and Eq.(19)) and let $\beta_{i'} - \beta_i = \Delta\beta$, $$T_{i'} T_i^{-1} V_i - V_{i'} = \left( \frac{\sin(\Delta\beta)}{\cos\alpha\cos\beta_i \cos(\phi) - \sin\beta_i \sin\phi} \right). \quad (25)$$

Consequently, for arbitrary $\{(X_j, Y_j, Z_j)^T\}$ and its two projection $p_{ij}$ and $p_{i'j}$, the transformed deviation $\Delta_j$ can be denoted as $$\Delta_j = s_{i'} R_{\gamma_{i'}} \left( \frac{\sin(\Delta\beta)}{\cos\alpha\cos\beta_i \cos(\varphi) - \sin\beta_i \sin\varphi} \right)(Z_j - Z_\mu). \quad (26)$$

By calculating the norm of $\|\Delta_j\|$, $$\|\Delta_j\| \le s_{i'} \|R_{\gamma_{i'}}\| \left| \frac{\sin\Delta\beta}{\cos\alpha\cos\beta_i \cos\varphi - \sin\beta_i \sin\varphi}(Z_j - Z_\mu) \right| =$$

$$s_{i'} \left| \frac{\sin\Delta\beta}{\cos\alpha\cos\beta_i \cos\varphi - \sin\beta_i \sin\varphi}(Z_j - Z_\mu) \right|.$$

If $\varphi = 0$, then the same bound as provided above results.

Robustness of the Method

Random subsets of markers of different sizes were sampled to measure the robustness of the disclosed method. There may be two ways to sample the subsets: 1) randomly sample a number of fiducial markers and their corresponding projections, so that each fiducial marker has a corresponding projection; and 2) randomly sample a number of fiducial marker projections from each micrograph, which means some markers may not have corresponding projects.

Both ways were used. The first situation is simple, because all the sampled fiducial markers have their corresponding projections, which means the dataset is noise-free (fiducial markers that do not have corresponding markers in previous views are referred to as outliers). The proposed method may guarantee the small deviation for the noise-free case. Experimental results also support the method. The proposed method almost always achieved 100% accuracy in such cases.

The second situation is much more difficult as there are outliers (markers without corresponding ones in previous views). According to the experiments, if the outlier ratio is controlled between 10% to 20% (e.g., if there are 100 fiducial markers in the (i+1)th view with 90 of them having corresponding markers in the ith view, the outlier ratio is 10%), and the fiducial markers are well distributed (not degenerated), there is almost no influence on the performance of the proposed method.

Figure 11A:
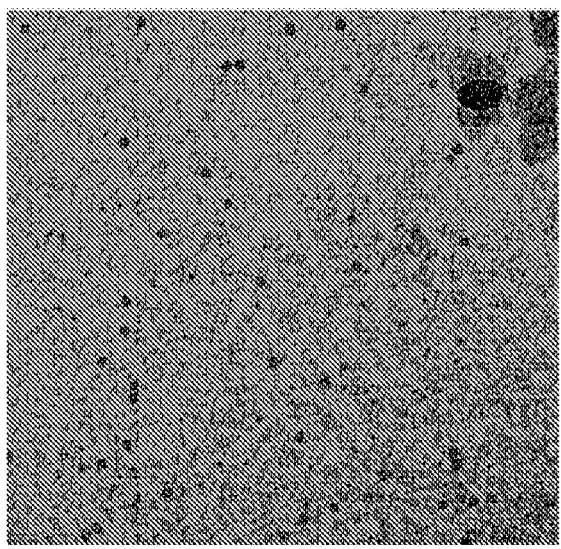
FIGS. 11a-11b illustrate exemplary sets of outliers in accordance with some embodiments discussed herein.
Figure 11B:
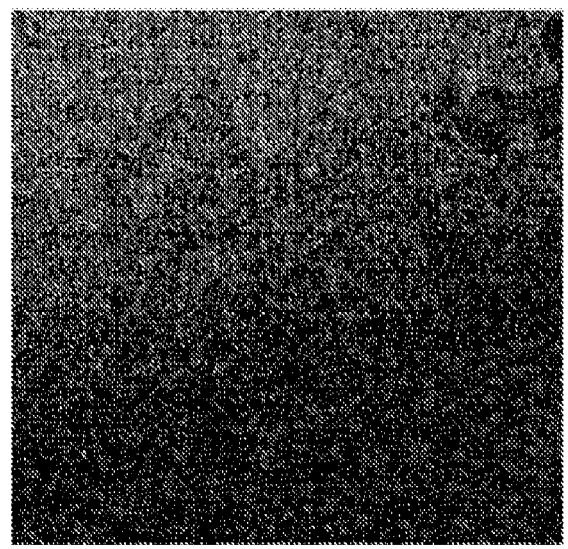

Even though the method is quite robust with respect to the outlier ratio, it may not be able to handle the cases where the outlier ratio is extremely high. Provided is an example. In recent work Han et al. (2017), the random sampling method was tested against several public datasets and achieved very good accuracy. Those datasets contain about 50-150 fiducial markers. Here was tested the proposed method on those datasets. When there are not too many outliers, the proposed method had high accuracy and short runtime. When there are too many outliers, the proposed method may fail. The main reason for failure is not due to the missing markers but the introduction of markers that do not appear in previous views. FIGS. 11a-11b show such an example, where FIG. 11a looks normal but FIG. 11b introduces a large number of fiducial markers that do not appear in FIG. 11a, which causes the total change of the probability distribution and thus the failure of the proposed method. How to further improve the robustness of the proposed method is ongoing work.

A micrograph with well-distributed fiducial markers may not contain overlapping fiducial markers. Therefore, the distance between two measured fiducial marker positions may be more than the diameters of the fiducial markers. Now denoting the diameter of a fiducial marker as D, if the tilt angle difference is $$\Delta\beta < \frac{D}{T},$$

the distributions of the fiducial markers on two views can be constrained by the affine transformation without any ambiguity. For example, if the diameter of fiducial markers is 20 pixels and the thickness of the specimen is 200 pixels, the maximum $\Delta\beta$ may be around 6° (0.1 Radian), which may be satisfied by almost all the tilt series.

Theorem: Suppose the pitch angle is fixed during tilt, for any arbitrary two projections (denoted as $p_i$ and $p_{i'}$), there is always a transformation A and t that can be applied to $p_i$ such that the total deviation over all the fiducial markers is upper bounded by $$\sum_{j=1}^{N} s_{i'} \left| \frac{\sin\Delta\beta}{\cos\alpha\cos\beta_i}(Z_j - Z_\mu) \right|,$$

where $$Z_\mu = \frac{1}{N}\sum_{j=1}^{N} Z_j.$$

Proof. By applying the construction of the transformation according to Equation (11) and Equation (12), both of which are independent of any specific fiducial marker, the upper bound can be derived by summing the upper bound in the Lemma over all the fiducial markers.

The upper bound may infer that the measured fiducial marker positions from a tilt series' different views can be related by the affine transformation within a very small deviation, which indicates that fiducial marker tracking based on a predefined mathematical model can achieve comparable results as the spatial marker-based tracking. The proved upper bound may have two direct applications: first, it may offer an affine prior to the prediction of fiducial marker positions, which will be useful for motion prediction and missing fiducial marker recovery; second, it can serve as the guide for the development of fast tracking methods.

Fiducial Marker Tracking by GMM

As shown above, an affine transformation assumption between two micrographs can be satisfied within a very small deviation, which may allow for fast and reliable fiducial marker tracking. As discussed below, a GMM may be used to represent a point set, and a point set registration solution from the view of probability distribution.

GMM Presentation of a Point Set

The positions of fiducial markers from a micrograph may be the fixed 'scene' point set $X=\{x_n, n=1, \ldots, N\}$ and the positions of fiducial markers from another micrograph as the moving 'model' point set $Y=\{y_m, m=1, \ldots, M\}$. An affine transformation $T(\cdot)$ so that there is a subset of $T(\ )$ with the maximum cardinality in which the points are corresponding to the points from a subset of the fixed 'scene' set X under a selected measure of distance (or equivalently, similarity).

For a point y, the probability density function that a point x is corresponding to y can be measured by a Gaussian kernel:

$$p(x|y) = \frac{1}{2\pi\sigma^2}\exp\left(-\frac{\|x-y\|^2}{2\sigma^2}\right), \quad (26)$$

where $\sigma$ is a punishment parameter for similarity. If point x is located in the same coordinate of y, the probability reaches its maximum. Given the point set Y, its GMM presentation can be $p(x|Y)=\Sigma_{j=1}^{m} P(m)p(x|y_m)$, where P(m) represents the prior probability of the mth point $y_m$. The set to set case (X to Y) can be generalized from the one point to set case as $$\frac{1}{2\pi\sigma^2}\sum_{n=1}^{N}\sum_{m=1}^{M} w_m e^{-\frac{\|x_n-T(y_m)\|^2}{2\sigma^2}},$$

where $w_m$, is the weight specified by the prior.

It is clear that the sum of the probability density function has the robust similarity form of $sim_{robust}=\Sigma\Sigma g(\|x-y\|^2)$, where $g(\cdot)$ is the M-estimator in Gaussian shape. Robust similarity is not a convex function. An heuristic solution such as simulated annealing may overcome some local maximums, but it is unable to guarantee a globally optimal solution.

Since the fiducial marker distribution may be corrupted by missing markers or the appearance of markers in high tilt angles, a feasible similarity punishment may ensure that the global solution of $sim_{robust}$ equals to the correct corresponding relationship of the point sets. The shape of the cost function may also be determined by $\sigma$. The solution may start from the determination of the similarity punishment $\sigma$. The concept of the point-spread function (PSF) may explain the criteria in a value determination. The PSF describes how blurry a single point-like emitter will appear when it is diffracted through a microscope and the full width at half maximum value of the PSF is used to characterize the resolution. The Gaussian kernel may be just like the PSF here and the resolution of the fiducial marker positions may be determined by the similarity and $\sigma$. Almost all the fiducial markers may be distinguishable under a given $\sigma$, which means that the peak of the Gaussian function may be retained under summation. Therefore, $\sigma$ can be determined as:

$$\sigma = \beta\min\left(\frac{1}{M}\sum_{m=1}^{M} dist(y_m, Y), \frac{1}{N}\sum_{n=1}^{N} dist(x_n, X)\right), \quad (27)$$

where $\beta \in [0.2, 0.5]$ is the parameter to control the distance interpretation and $dist(x, X)$ refers to the minimum distance between the point x to the points belonging to X (except itself).

Fast Parameter Refinement by CPD

Coherent point drift (CPD) may be used for the estimation of transformation $T(\cdot)$. The view of CPD is from the aspect of assignment and CPD introduces a representation of the outliers. Given a point x, it has P(m) probability corresponding to the mth point $y_m$, thus its total probability that belongs to the point set Y may be denoted as $\Sigma_{j=1}^{m} P(m)p(x|y_m)$. Considering the probability that point x may represent an outlier, let w denote the outlier probability. Assuming x is sampled from the point set X randomly and the points in Y share an equal prior probability, the mixture model may take the form as:

$$p(x) = w\frac{1}{N} + (1-w)\sum_{j=1}^{m}\frac{1}{M}p(x|y_m). \quad (28)$$

The cost function in CPD is defined as the minimization of the negative log-likelihood function:

$$E(T(\cdot),\sigma^2) = -\Sigma_{n=1}^{N} \log \Sigma_{m=1}^{M+1} P(m)p(x|y_m), \quad (29)$$

where P(m) is the reweighted prior and $$p(x|y_{M+1}) = \frac{w}{N}$$

represents the probability of outliers. The negative likelihood function has an obvious advantage that it can be effectively solved by an expectation-maximum (EM) algorithm.

According to Jensen's inequality, the upper bound of the negative log-likelihood function used in the EM algorithm can be defined as:

$$Q = -\Sigma_{n=1}^{N} \Sigma_{m=1}^{M+1} p^{old}(m|x_n) \log(P^{new}(m)p^{new}(x_n|y_m)), \quad (30)$$

where $p(m|x_n) = P(m)p(x_n|y_m)/p(x_n)$ is the corresponding probability between $y_m$ and $x_n$, the 'old' parameters indicate the guess of values in the E-step and the 'new' parameters may be determined by minimizing the expectation of the complete negative log-likelihood function in the M-step. The E-step and M-step are iterated until convergence.

E-Step:

Ignoring the constants, the objective function in the E-step can be rewritten as:

$$Q(A, t, \sigma^2) = \quad (31)$$

$$\frac{1}{2\sigma^2} \sum_{n=1}^{N} \sum_{m=1}^{M} p^{old}(m|x_n) \|x_n - T(y_m; A, t)\|^2 + \frac{N_p D}{2} \log \sigma^2,$$

where $T(y_m; A, t) = Ay_m + t$, $N_p = \Sigma_{n=1}^{N} \Sigma_{m=1}^{M} p^{old}(m|x_n) \leq N$ (with $N = N_p$ only if $w=0$), and $p^{old}(m|x_n)$ denotes the posterior probabilities of GMM components calculated using the previous parameter values:

$$p^{old}(m|x_n) = \frac{\exp\left(\frac{1}{2}\left\|\left(\frac{x_n - T(y_m, A^{old}, t^{old})}{\sigma^{old}}\right)\right\|^2\right)}{\Sigma_{k=1}^{M} \exp\left(\frac{1}{2}\left\|\left(\frac{x_n - T(y_k, A^{old}, t^{old})}{\sigma^{old}}\right)\right\|^2\right) + c}. \quad (32)$$

Here $$c = 2\pi\sigma^2 \frac{w}{1-w} \frac{M}{N}.$$

Within a feasible local interval, minimizing the objective function Q in the E-step may be equal to solving the negative log-likelihood function E in Equation (29).

M-Step:

In the M-step, the affine matrix A and tin $T(\cdot)$ that minimizes the objective function Q may be found. Q may have a closed-form expression. For the convenience of the following discussion, several representations of variables may be introduced:

1. $X_{N \times 2} = (x_1 \ldots x_N)^T$—matrix presentation of the point set X;
2. $y_{M \times 2} = (y_1 \ldots y_M)^T$—matrix presentation of the point set Y;
3. 1—the column vector of all ones;
4. d(a)—the diagonal matrix formed from vector a;
5. P—the matrix that is composed by $p_{mn} = p^{old}(m|x_n)$.

First, the root of the partial derivative Q with respect to t may be found and then t may be substituted back into the objective function to obtain the matrix A. Here the equation of $$\frac{\partial Q}{\partial t}$$

may take the form as:

$$\frac{\partial Q}{\partial t} = \frac{1}{\sigma^2} \sum_{n=1}^{N} \sum_{m=1}^{M} p^{old}(m|x_n)(x_n - Ay_m + t) = 0, \quad (33)$$

in which the root t is $$t = \frac{1}{N_p} \sum_{n=1}^{N} \sum_{m=1}^{M} p^{old}(m|x_n)(x_n - Ay_m). \quad (34)$$

By introducing the variables $$\mu_x = \frac{1}{N_p} X^T P^T 1, \, \mu_y = \frac{1}{N_p} Y^T P 1, \, t$$

can be rewritten as $t = \mu_x - A\mu_y$.

Then, t can be substituted back into Q and the equation of partial derivative $$\frac{\partial Q}{\partial A}$$

can be solved. The root A is $$A = (\hat{X}^T P^T \hat{Y})(\hat{Y}^T d(P1) \hat{Y})^{-1} \quad (35)$$

where $\hat{X} = X - 1\mu_x^T$, $\hat{Y} = Y - 1\mu_y^T$. $\sigma^2$ is also updated according to the result of $$\frac{\partial Q}{\partial \sigma^2}:$$

$$\sigma^2 = \frac{1}{N_p D}\left(tr\left(\hat{X}^T d(P^T 1)\hat{X}\right) - tr\left(\hat{X}^T P^T \hat{Y} A^T\right)\right). \quad (36)$$

After solving the matrix A and t, the moving 'model' point set Y is then updated by $T(y_m) = Ay_m + t$.

Divide-and-Conquer Strategy Against Lens Distortion

A problem in fiducial marker tracking may be that the shape context of fiducial markers on a micrograph can be easily corrupted. Although the affine transformation relationship can serve as a global constraint and suppress the effect of outliers, spherical aberration of the lens and non-uniform magnetic fields may result in non-uniform magnification of the micrographs, which may increase the deviation of the global affine constraint. Furthermore, as an algebraic solution to the point set registration, CPD may still have problems in local convergence, which may lead to incorrect correspondence. In some embodiments, provided herein is a method to overcome the local convergence issue. In some embodiments, the procedure of fiducial marker matching based on the GMM is illustrated in method 1, where the threshold d is used to determine whether two points from different point sets are close enough.

---

Method 1: Recover correspondence between X and Y.

input: x, y
1: Generate initial estimation of T(·; A, t) by grid search;
2: Select several {T(·)} as initial inputs
3: for all $T_i \in \{T(\cdot)\}$ do
4:    Estimate $T_i$ by CPD as in Section 2.2.2
5:    Apply $T_i$ to y
6:    Calculate $sim_{robust}$ (X, $T_i$(y))
7:    if $sim_{robust}$ is large enough then
8:      Use $T_i$ and stop trying
9:    end if
10: end for
11: T(·) ← $T_i$(·)
12: return T(·)

---

In some embodiments, the initial value of a may be assigned according to Equation (27). As a compensation, a grid search of the applicable value of the transformation matrix A and t with a step size of 2.5σ may be conducted at the beginning. The initial values of A and t with a high value of the robust similarity measure are fed into CPD. Under the assumption that the pitch angle almost remains unchanged, the simplified version of A according to Equation (11) may be obtained:

$$A = \frac{s'_i}{s_i} R_{\gamma_{i'}} \begin{pmatrix} \frac{\cos\beta'_i}{\cos\beta_i} & \frac{\tan\alpha\sin\Delta\beta}{\cos\beta_i} \\ 0 & 1 \end{pmatrix} R_{-\gamma_i}. \quad (37)$$

In some embodiments, the values of $s_{i'}$ and $s_i$ may be very close to each other. The values of $\beta_{i'}$ and $\rho_i$, may be assigned from the recorded tilt angles when designing the search range of A. Considering the real pitch angle in a tilt series, tan α may be a very small value and can be neglected. Therefore, the search range of A may be indeed very small. If the tilt angle interval is not too large, the affine matrix A may degenerate to a rotation matrix. However, it is enough for an initial estimation of A. The search range of t may be limited in half the width of the micrographs, which is enough considering the actual shift. The transformation which has a high rank of $sim_{robust}$ (X, $T_i$(Y)) may be used as the initial seed for further estimation. The fine estimation of transformation T(•) may be then carried out by CPD. The refined value T(•) with the highest $sim_{robust}$ (X, T(Y)) may be outputted as the final result.

In some embodiments, the affine transformation relationship may not cover all the correspondence of two sets of fiducial markers under the effect of lens distortion. Thus, in some embodiments, a divide-and-conquer strategy can solve this issue. Provided below is one exemplary method (Method 2):

---

Method 2: Refine transformation T(·) against lens distortion input: x, y, T, and distance threshold d
1: C ← ∅; Φ ← ∅
2: while dist(x,T(y)) < d do
3:    Apply T(·) to y
4:    for all x ∈ x and y ∈ y do
5:      if dist(x, T(y)) < 0.75d then
6:        C ← C U (x,y)
7:      end if
8:      M ← ∅
9:      if dist(x, T(y)) < d then
10:       M ← M U (x,y)
11:      end if
12:    end for
13:    Φ ← Φ U T
14:    Recalculate transformation T by M
15: end while
16: return C and Φ

---

In some embodiments, a coarse distance threshold d may be used, such as the diameter of the used fiducial markers. The input may be the result from Method 1. Firstly, the transformation T(·) may be applied to Y and then the peer distance with X may be calculated. If the distance of two points from different point sets is less than the distance threshold d, the point pair may be considered as a matched pair. If the distance is less than 0.75 d, the matched pair may be directly outputted; if not, the matched pair may be used to recalculate the transformation T(·). In some embodiments, it may be assumed that the distortion is mild and continuous. In the next iteration, the procedure may be rerun to generate the satisfied correspondence until no matched point pair can be found between X and T(Y). Finally, multiple T's may be outputted to describe the distortion in the micrographs.

EXPERIMENTAL

Test Datasets

Figures 5A, 5B, 5C:
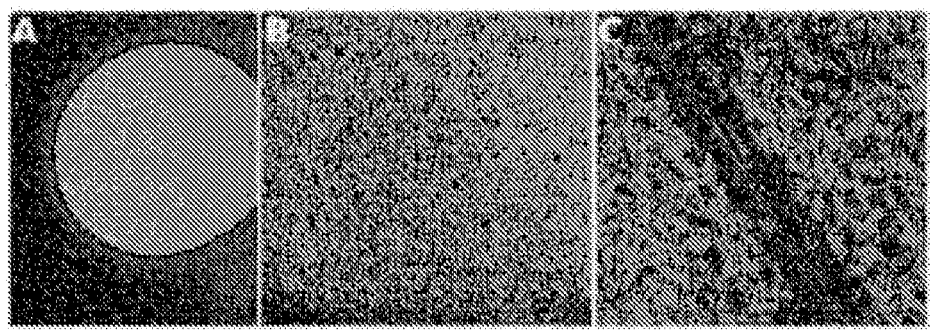
FIGS. 5a-5c illustrate exemplary fiducial markers dispersed on samples in accordance with some embodiments discussed herein.

Three datasets were used. The first dataset, VEEV, was a tilt series with the fiducial markers located sparsely on the surfaces (FIG. 5A). In this specimen, cryo-EM grids were prepared by depositing 5 μL of VEEV mixed with gold beads on 200 mesh Quantifoil copper grids with a holey carbon support. An additional thin carbon film was overlaid on the grids before specimen deposition. The tilt series was taken by a DE20 camera (Direct Electron, LP, San Diego, Calif.) with a cumulative dose of ~55-70e/$A^2$ per tilt series. The tilt angles of the projection images ranged from −50.0° to +50.0° at 5° intervals. In total, there were 21 images in the tilt series. The size of each tilt image was 3K×4K with a pixel size of 0.1 nm. Because this dataset had about 40-50 fiducial markers sparsely located on one surface, it is feasible to be used to assess the tracking deviation in real datasets.

The second dataset, Hemocyanin, was a tilt series of vitrified keyhole limpet hemocyanin solution (FIG. 5B). Hemocyanin was bought from Sigma-Aldrich (USA) and buffered in phosphate-buffered saline solution with a protein concentration of 1 mg/ml. The 300 mesh copper EM grids with holey carbon film (Quantifoil R2/1) were bought from EMS (Electron Microscopy Sciences, USA). Protein solution was applied to glow discharged grids and blotted in Vitrobot N (FEI, the Netherlands) using 4 s blotting time under blotting force 2. The blotting chamber conditions were kept at 4% and 100% humidity. After blotting, the grids were plunge-frozen in liquid ethane cooled by liquid nitrogen. The cryo-ET data were collected by FEI Titan Krios (operated at 300 kV) with a Gatan US4000 camera. The total dose used during data collection was around 8000 e/nm². There were 95 images with the tilt angles ranging from −70.0° to +70.0° at 1°-2° intervals. The size of each tilt image was 2K×2K with a pixel size of 0.4 nm. This is a dataset was used in previous work (Han et al., 2015).

The third dataset, Adhesion belt, was a tilt series of adhesion belt structure (FIG. 5C). The Adhesion belt dataset was provided by the National Institute of Biological Sciences of China. The data were collected by an FEI Titan Krios (operated at 300 kV) with a Gatan camera. There were 111 images, with tilt angles ranging from −50.0° to +60.0° at 1°-2° intervals. The size of each tilt image was 2K×2K, with a pixel size of 2.03 nm (2 magnitude-binned). The initial orientation of the tilt azimuth with respect to the vertical direction of the image was 2.4°. This dataset had a mass of fiducial markers embedded in the specimen, which provided a proper dataset to compare the runtime of the previous work and the current method.

Experimental Performance

Verification of the Theoretical Bound

Figure 6A:
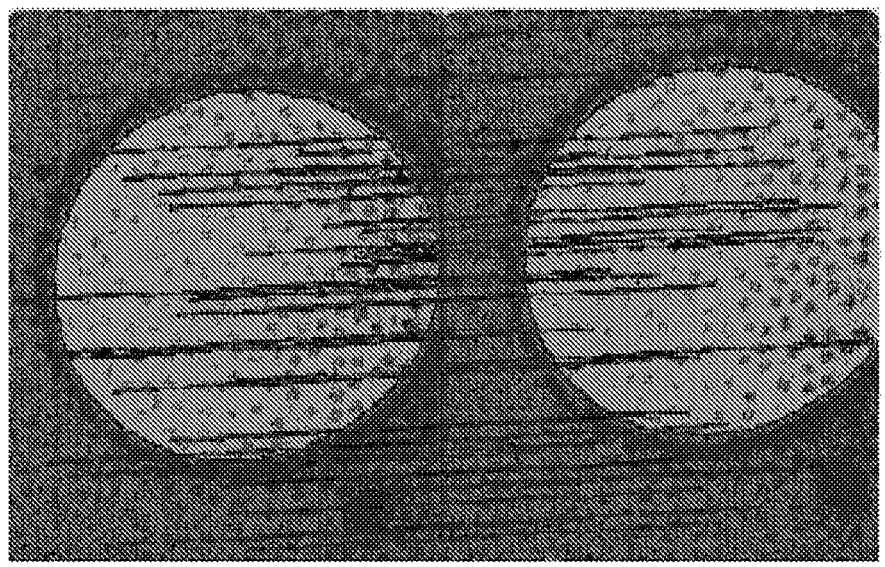
FIG. 6a illustrates the relationship of fiducial marker positions between micrographs with different tilt angles in accordance with some embodiments discussed herein.
Figure 6B:
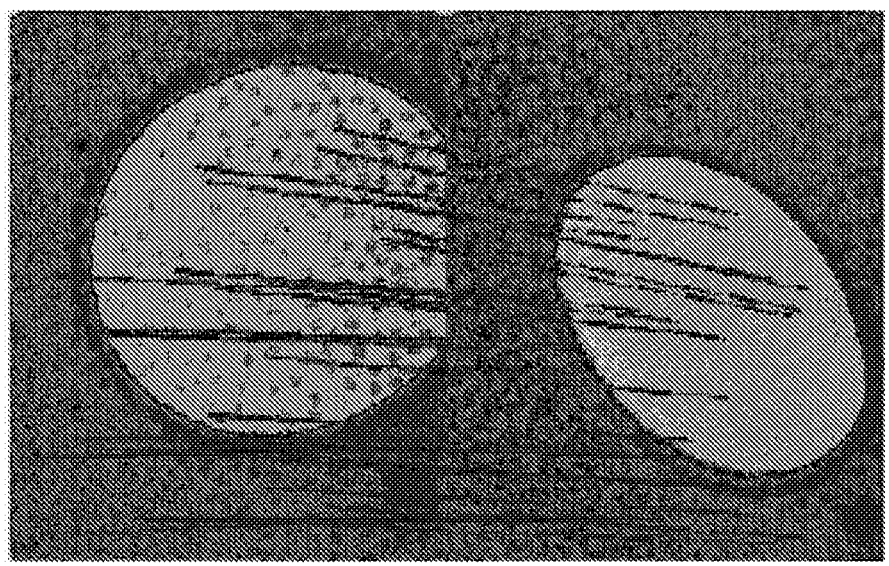
FIG. 6b illustrates the relationship of fiducial marker positions between micrographs with different tilt angles in accordance with some embodiments discussed herein.
Figure 6C:
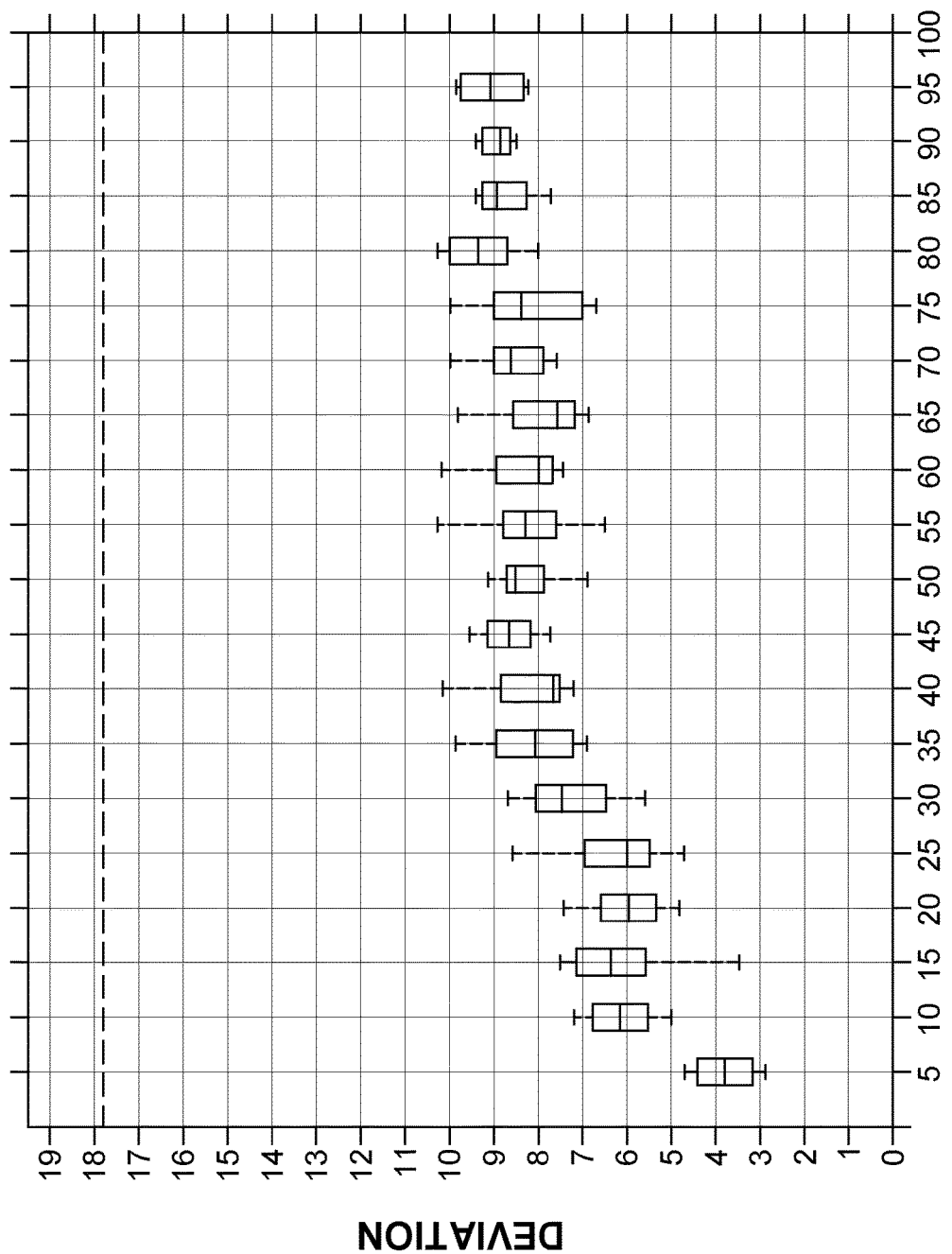
FIG. 6c illustrates a match error of micrographs with different tilt angle intervals in accordance with some embodiments discussed herein.

The theoretical upper bound given above was analyzed to determine if it held in real-world datasets. Since the VEEV dataset was taken in a large zoom scale and had a good distribution of fiducial markers, it was used. Firstly, the fiducial marker positions were extracted by an automatic fiducial marker detection method (Han et al., 2015) and then the fiducial marker positions belonging to different micrographs were matched. According to the angle values of the VEEV dataset, ith and the (i+n) th micrographs (n=1, 2 . . . N−i) and obtained the corresponding point set registration results. All the fiducial marker positions were matched by the GMM-based solution. In case of notable difference between cos β' and cos β (i. e. cos(β')/cos(β)>1.2), the full implementation of Equation (37) was used for the coarse estimation. Since in practice cos β' and cos β may be similar, Equation (37) may not be needed, but rather to guarantee the completeness of the method. FIGS. 6a-6d illustrate the fiducial marker match results. FIG. 6a presents the relationship of fiducial marker positions between the micrographs from −5° and 0° tilt angles. As shown in FIG. 6a, the links used to mark the correspondent relationship are almost parallel to each other, which indicates that the fiducial marker positions have not changed a lot between these two views. FIG. 6b presents the relationship between the fiducial markers from 0° and 50° tilt angles in which the tilt angle difference is 50°. As expected, the related positions of the fiducial markers have changed a lot due to the tremendous difference of tilt angles. FIG. 6c gives the match error of micrographs with different intervals of the tilt angle. For each interval, the box plot indicates the distribution of the registration error for the point set registration: firstly, the average deviation of each point set registration result was calculated and then the box plot was drawn based on this average deviation. According to the tilt angle values, the first box plot contained 20 average deviations, the second contained 19 and so on. It can be noticed that the deviation is the smallest when the tilt angle interval is 5° and the average deviation increases when the tilt angle interval increases. FIG. 6c is very useful for the design of tracking methods. According to the values of the average deviation, when the tilt angle interval is less than 20°, the deviation is <6 pixels, which is much smaller than the fiducial marker diameter value (18 pixels). Therefore, when designing tracking algorithms, the micrographs whose tilt angle interval is less than 20° can be matched and then the results combined.

Effectiveness of the Divide-and-Conquer Strategy

Figure 6D:
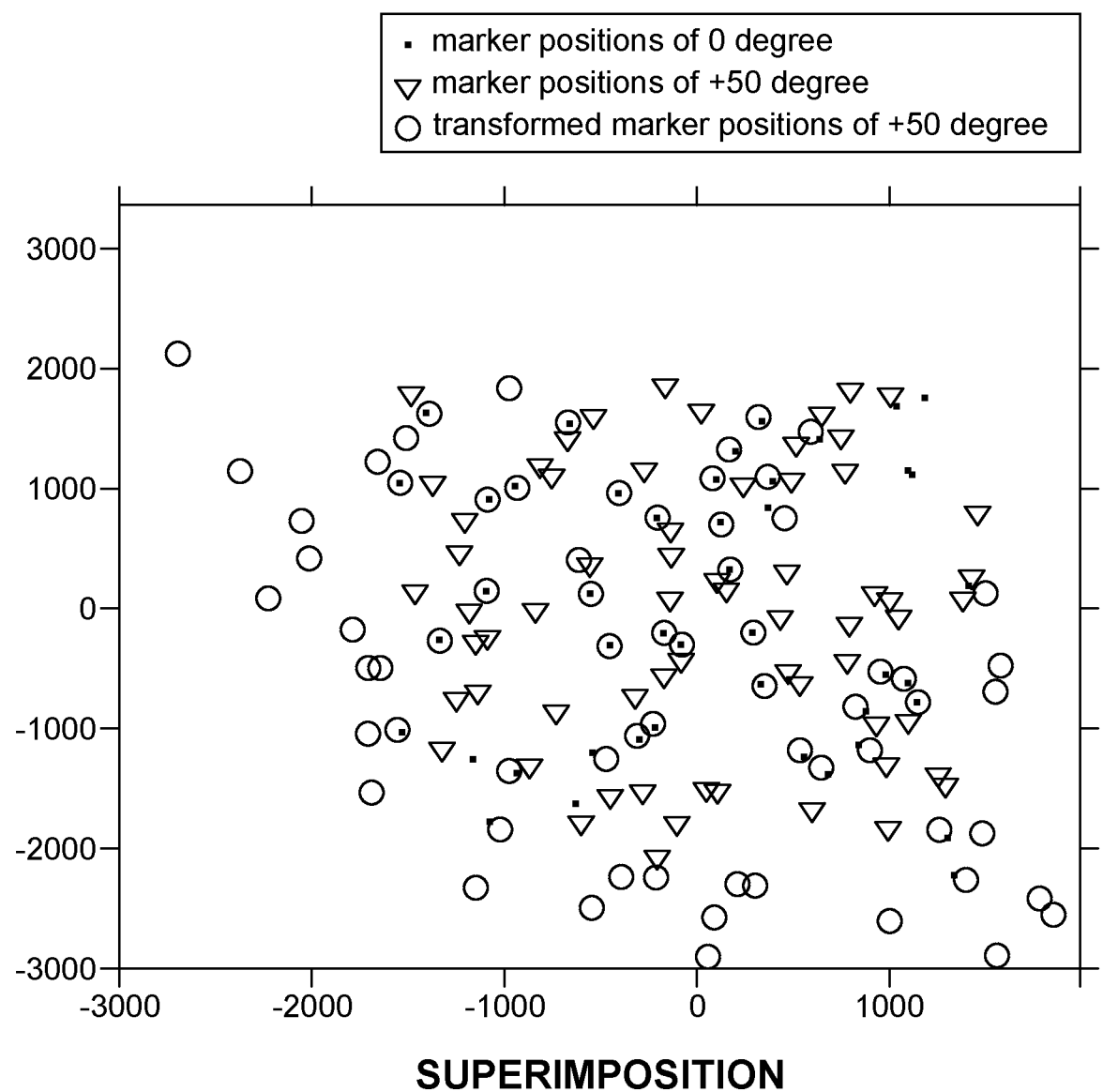
FIG. 6d illustrates a superimposition of fiducial marker positions from the micrographs with different tilt angles and affine transformed marker positions from a micrograph in accordance with some embodiments discussed herein.
Figure 7:
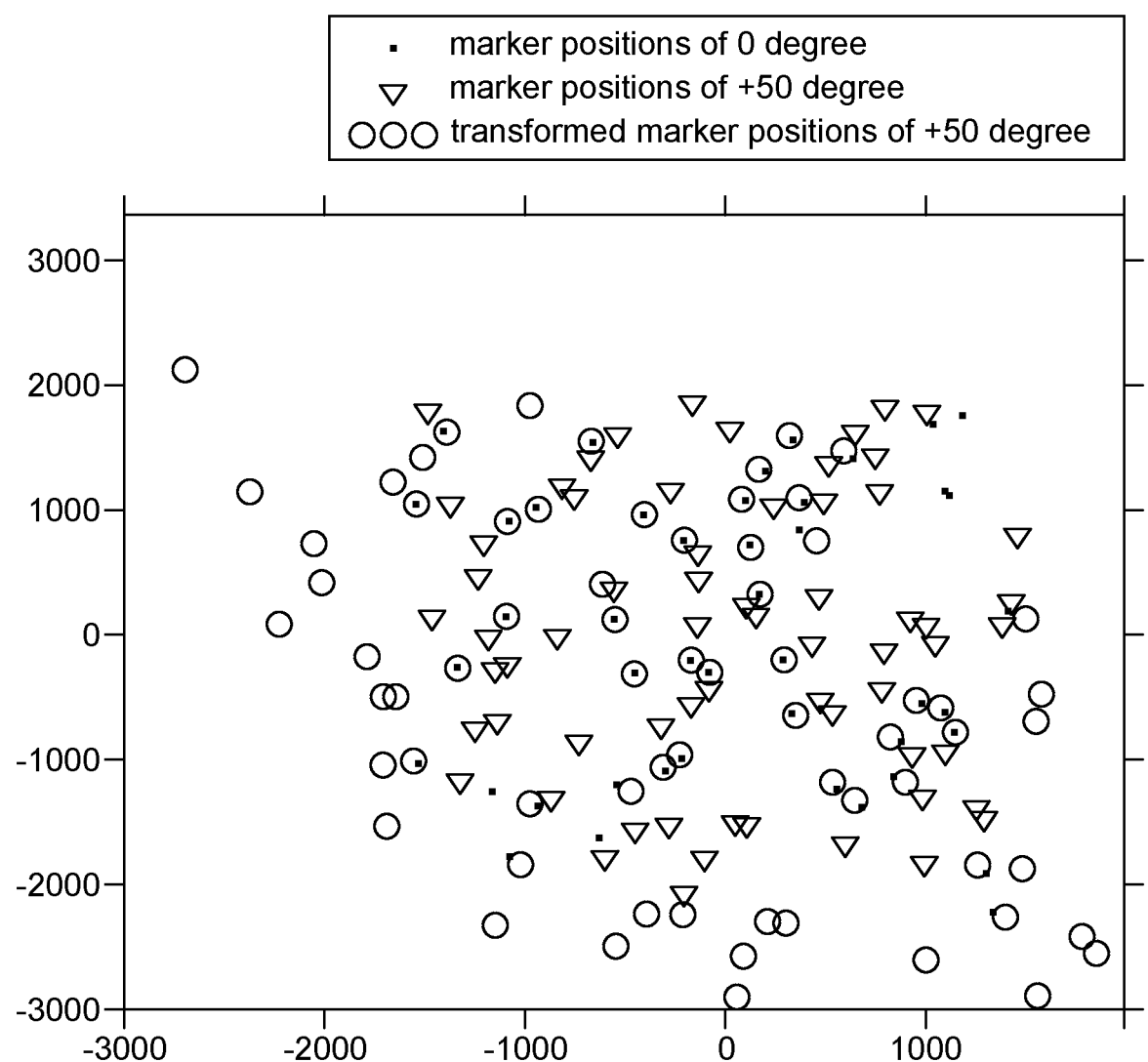
FIG. 7 illustrates transformed unmatched fiducial markers in accordance with some embodiments discussed herein.

FIG. 6d shows the superimposition of fiducial marker positions from the micrographs with 0° and 50° tilt angles (labeled by 'dot' and 'inverted triangle', respectively), and the affine transformed marker positions from the micrograph with 50° tilt angle (labeled by 'circle'). The GMM-based fiducial marker tracking method (Method 1) can reasonably well recover the correspondence between fiducial markers in the two micrographs, but the lens distortion issue may be present. FIG. 7 illustrates the transformed fiducial marker positions in FIG. 6d after applying the divide-and-conquer refinement to resolve the lens distortion issue (Method 2). Superimposition of fiducial marker positions form the micrographs with 0° and 50° tilt angles (labeled by 'dot' and 'inverted triangle', respectively), and the affine transformed marker positions from the micrograph with 50° tilt angle (labeled by 'circle'). Divide- and conquer method may be used was used to reduce the effect of lens distortion: the fiducial markers labeled by red 'circle' and green 'circle are the ones matched correctly with the fixed fiducial markers from 0°; and the fiducial markers labeled by black 'circle' are regarded as outliers. According to the present disclosure, the two datasets may be matched by threshold 0.75 d and labeled the matched points. Then the remaining unmatched points were reformed into two new point sets and were matched by d. This procedure was repeated until no more matched points could be labeled. In this dataset, the fiducial marker diameter was used as a strict distance threshold. After applying the present disclosure, the fiducial markers from the 50° micrograph were divided into three separate point sets. As shown in FIG. 7, the method ran for three rounds, and two affine transformation parameters were calculated and applied to the fiducial markers. The transformed fiducial markers denoted by red 'circle' and green 'circle' are the ones matched correctly with the fixed fiducial markers, whereas the fiducial markers that are labeled by black 'circle' belong to the third point set for which a uniform transformation to the fixed point set was difficult to be found. There were 28 matched pairs of fiducial markers detected after the present disclosure was applied, whereas there were only 22 matched pairs without this refinement step (FIG. 6D).

In some embodiments, the fiducial marker alignment does not need to be applied to match the whole set of micrographs. Instead, in some embodiments, only the adjacent micrographs or micrographs within several intervals may be matched. Keeping the tilt angle interval smaller than 20° and using the transitivity of fiducial marker positions on different micrographs can lead to more reliable fiducial marker tracking. Therefore, the effect of lens distortion may be difficult to be observed in the matching result of two micrographs with a small tilt angle interval. However, according to the deviation value in Equation (14), a relatively large deviation may still be observed in the high tilt angles. Under this circumstance, the effect of lens distortion may be enlarged. The present disclosure can be used to obtain better fiducial marker tracking. Here, the Hemocyanin dataset is an illustration. The adjacent micrographs and the micrographs with one interval apart was matched. Because the interval of tilt angles was very small in the Hemocyanin dataset, almost all the fiducial markers can be tracked with high quality without lens distortion correction. However, micrographs with high tilt angles may still encounter lens distortion issues, which require the divide-and-conquer refinement.

Figure 8A:
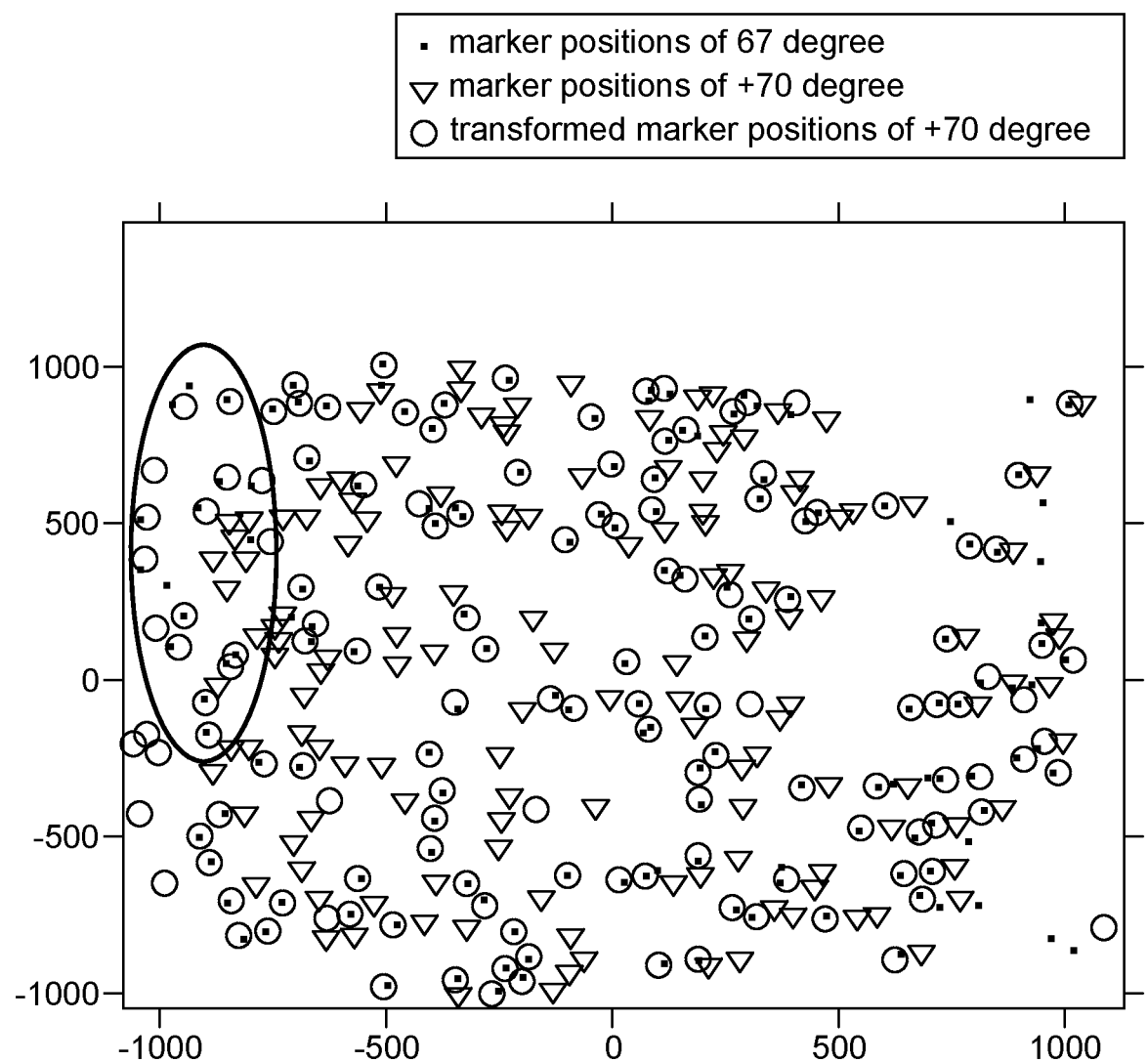
FIG. 8a illustrates a first set of matched fiducial markers and FIG. 8b illustrates transformed unmatched and matched fiducial markers resulting in a second set of matched fiducial markers in accordance with some embodiments discussed herein.
Figure 8B:
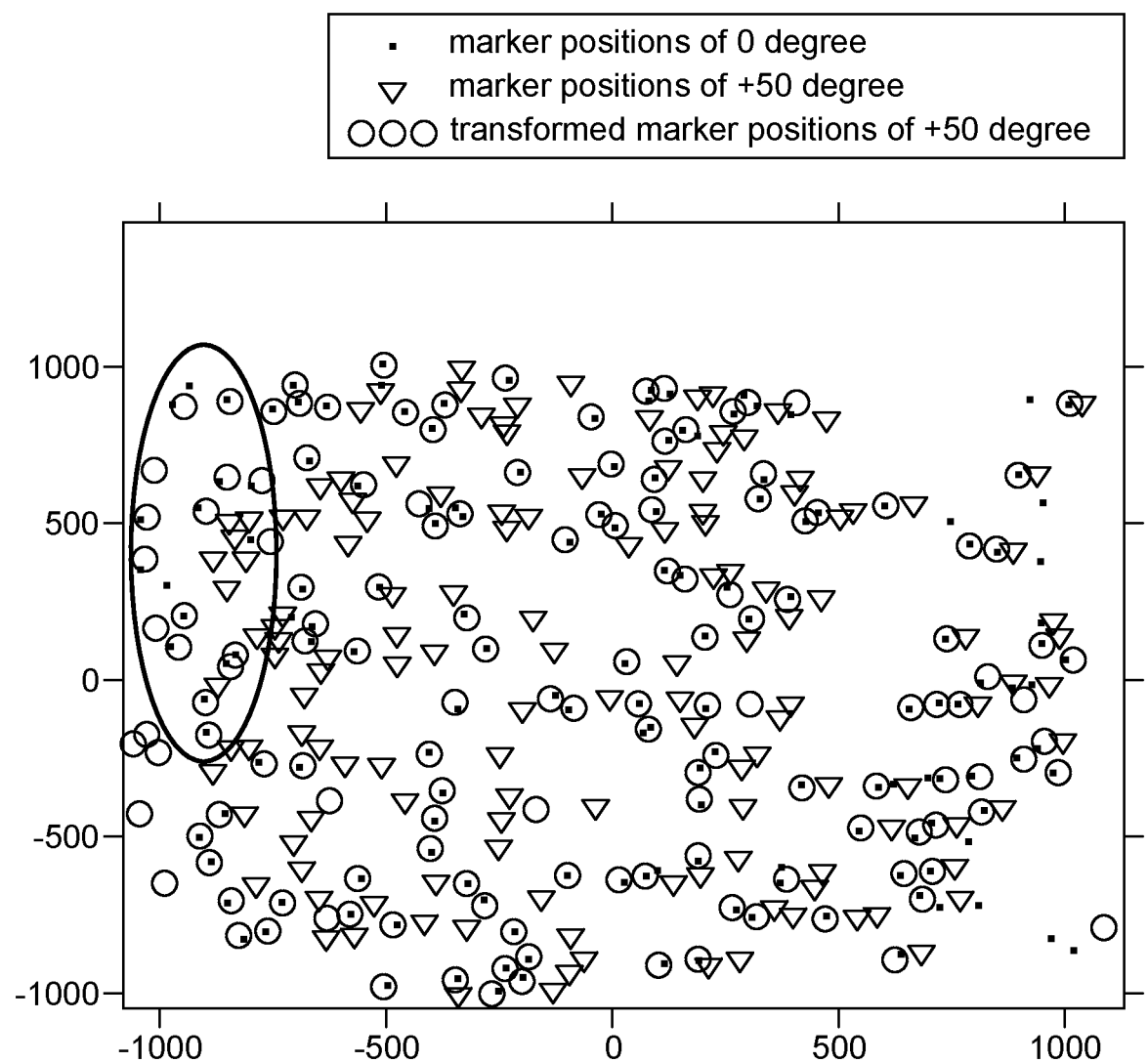

FIGS. 8a and 8b show the matching results from the micrographs with 67° and 70° tilt angles (labeled by 'dot' and 'inverted triangle,' respectively) and the affine transformed marker positions from the micrograph with 70° tilt angles (labeled by 'circle'). For each micrograph, 180 fiducial marker positions were detected and used in fiducial marker matching. FIG. 8a shows the result directly matched by the affine transformation model, in which the majority of the fiducial markers were correctly matched, but some markers still have relatively large deviation (e.g. the fiducial markers in the green ellipse region). FIG. 8b shows the result in which the lens distortion was resolved by the divide-and-conquer algorithm: the fiducial markers labeled by red 'circle' and green 'circle' are the ones matched correctly with the fixed fiducial markers; and the fiducial markers labeled by black 'circle' are concerned as outliers. It is clear that the fiducial markers located in the green ellipse region have much smaller deviation compared to the previous result. By directly applying the affine transformation, 155 pairs of the correctly tracked fiducial markers were obtained, whereas after the application of the divide-and-conquer algorithm, 161 pairs were correctly tracked. The results illustrate the effectiveness of the lens distortion refinement.

Computational Efficiency

Figure 9A:
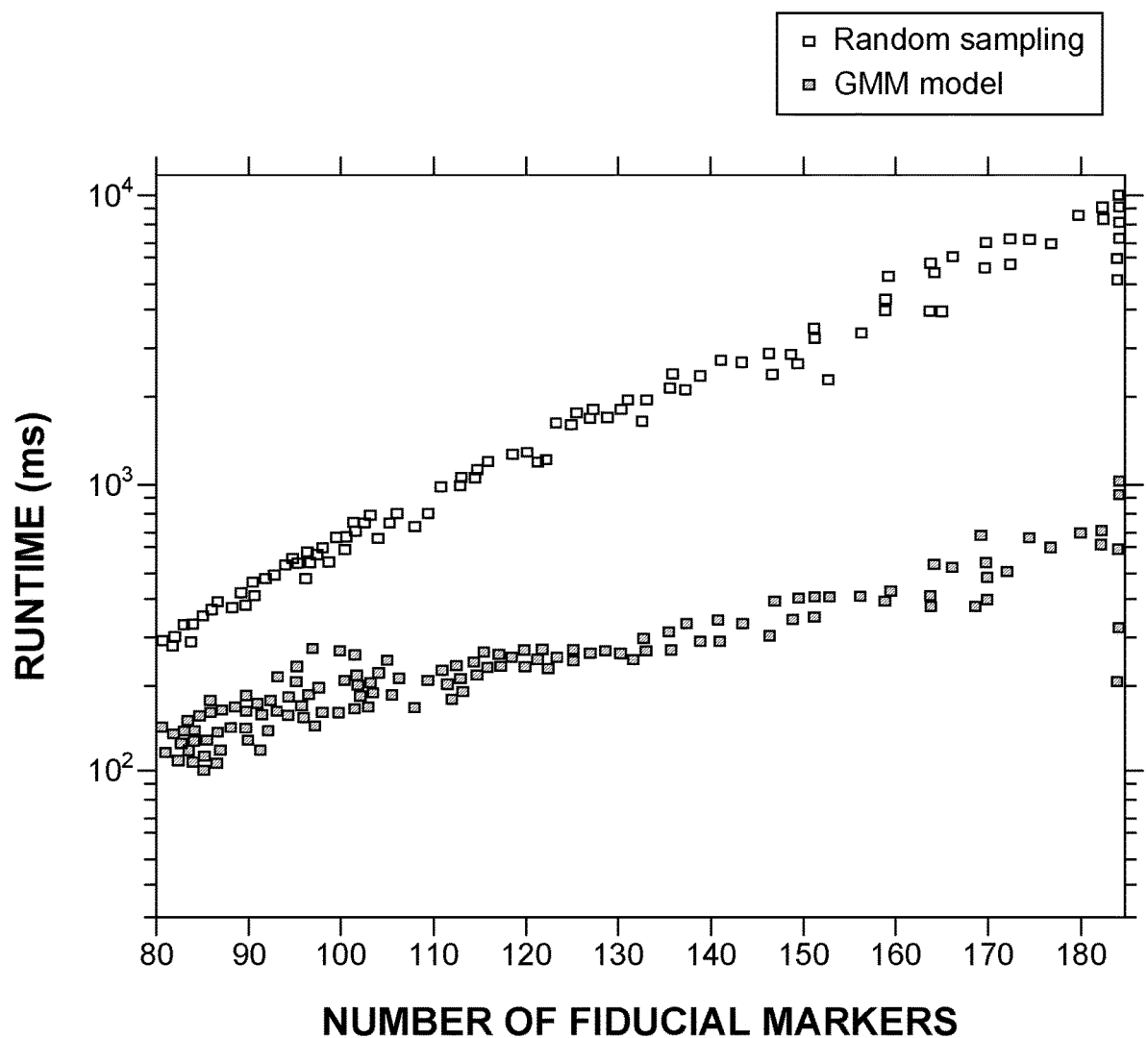
FIGS. 9a and 9b illustrate a comparison of the runtime between an exemplary embodiment of the present disclosure in accordance with some embodiments discussed herein and a previous random sampling work.
Figure 9B:
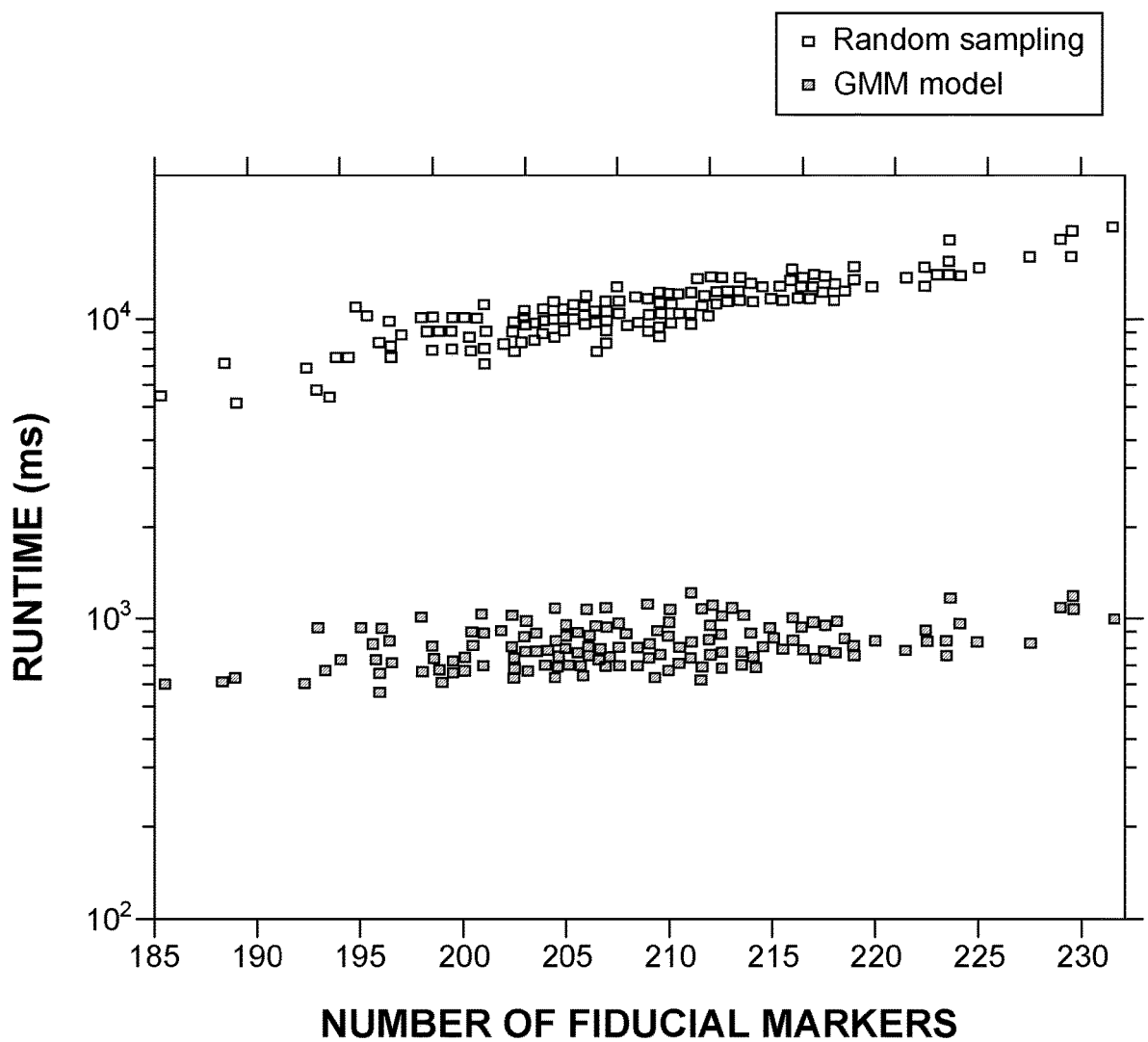

Another merit of the present disclosure may be the speedup gained from the application of the GMM. Though previous work may align a classic cryo-ET dataset in about 3-5 min, the process of a large-field dataset which has hundreds of fiducial markers embedded in remains a problem. With the present disclosure, the model-based fiducial marker tracking can be solved in a simpler way. According to the present disclosure, if the micrographs' tilt angle interval is not too large, the coarse estimation of the transformation matrix A can be simplified as a rigid matrix. If the coarse estimation in Method 1 is replaced by rigid transformation, a significant speedup without the loss of accuracy may be obtained. FIGS. 9a and 9b illustrate a comparison of the runtime between an exemplary embodiment of the present disclosure and a previous random sampling work. Here, for the Hemocyanin dataset (FIG. 9a) and the Adhesion belt dataset (FIG. 9b), the fiducial marker positions in the nth and (n+1)th, and nth and (n+2)th micrographs were matched. Both the algebraic solution and the random sampling solution were run on a Fedora 25 system with 128 Gb memory and two E5-2667v4 (3.2 GHz) CPU. In FIGS. 9a and 9b, the x-axis represents the average number of fiducial marker positions for each matching operation, and the y-axis represents the runtime (ms) in the log scale. When the number of fiducial marker increases (e.g. >150), the previous random sampling solution needs about 2000-5000 ms to finish a fiducial marker matching of two micrographs, whereas the current GMM-based solution only needs 200-500 ms. The total tracking time is consistent with the above results. For the Hemocyanin dataset, to generate the whole track model, the random sampling solution and the GMM-based solution cost 263 196 ms (4.38 min) and 41 164 ms (0.68 min), respectively. For the Adhesion belt dataset, to generate the whole track model, the random sampling solution and the GMM-based solution cost 2 325 557 ms (38.76 min) and 176 987 ms (2.95 min), respectively. Because for the Hemocyanin dataset, most of the micrographs only had 80-120 fiducial markers, the total runtime for random sampling was not too long. On the contrary, most of the micrographs had 195-255 fiducial markers in the Adhesion belt dataset, so the runtime cost by the random sampling solution was about 10 times longer than that of the GMM-based solution. The trend will continue if the number of fiducial markers increases. Therefore, the GMM-based solution was much faster for the datasets with a large number of fiducial markers.

Performance in Marker-Based Alignment

Figure 10A:
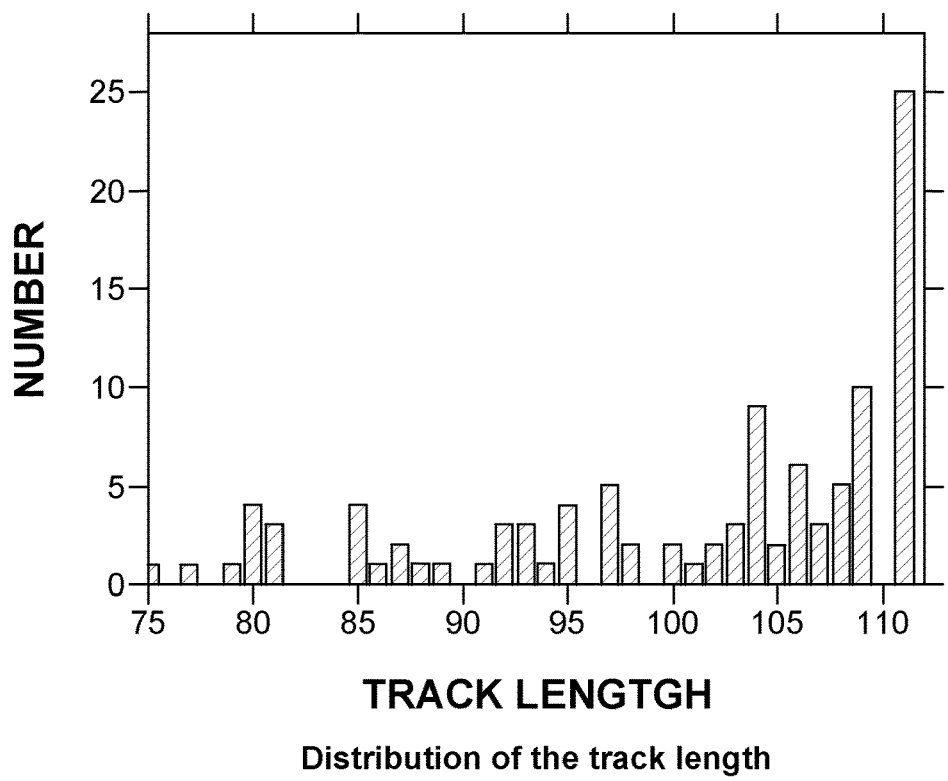
FIGS. 10a-10d illustrate the application of the disclosed method on a sample in accordance with some embodiments discussed herein.
Figure 10B:
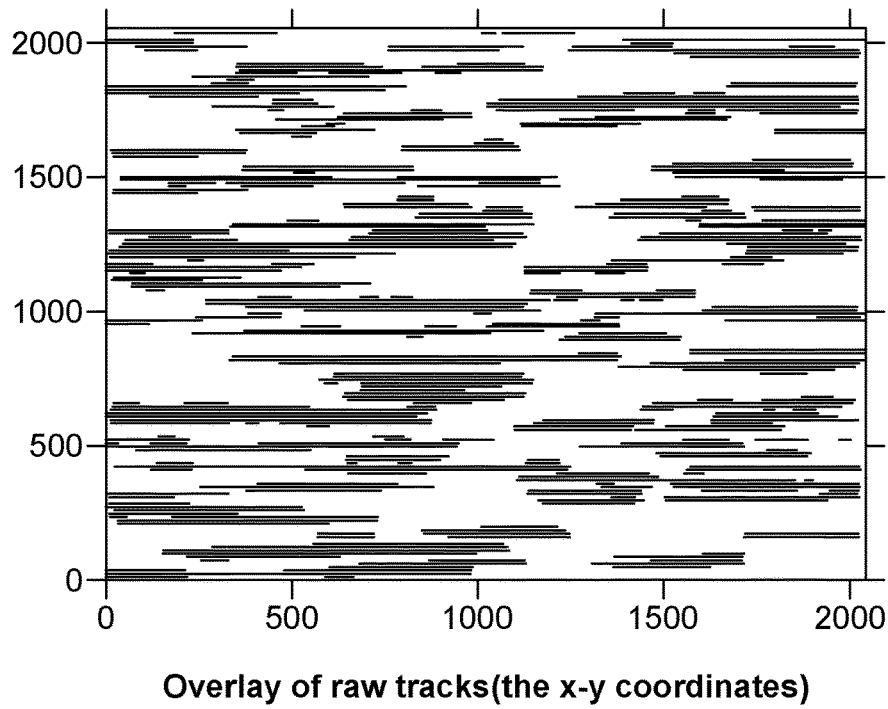
Figure 10C:
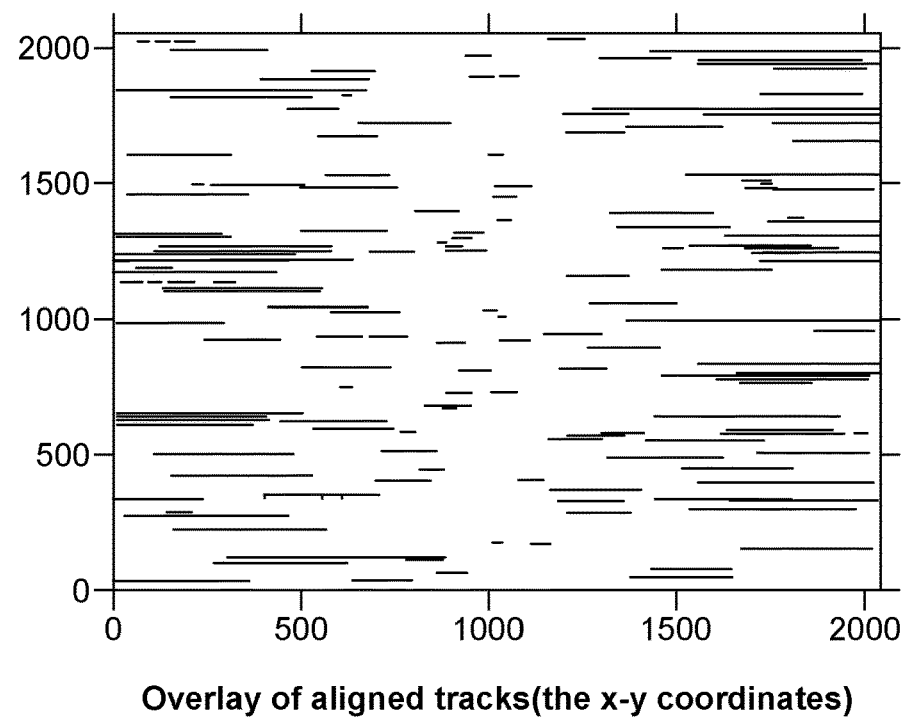
Figure 10D:
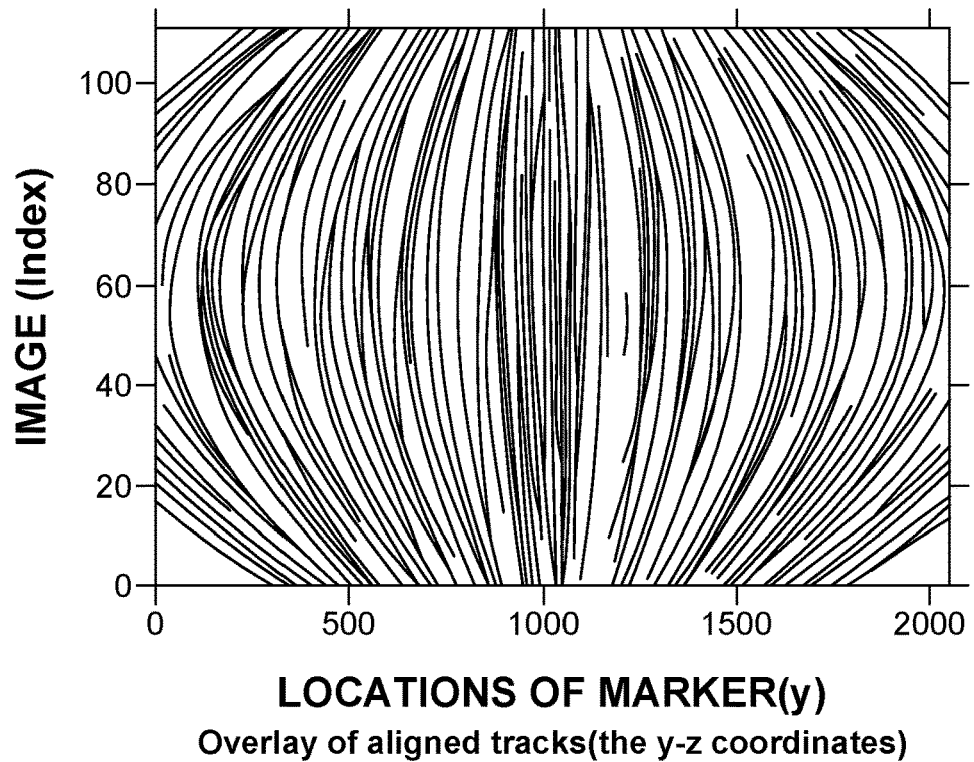

To test the correctness of the proposed GMM-based tracking model, it was integrated into to a prior alignment scheme (Han et al., 2015, 2017) and obtained the alignment result for the Adhesion belt dataset (FIGS. 10a-10d). FIG. 10a illustrates a histogram of the length of assembled fiducial markers tracks. FIG. 10b illustrates an overlay of the raw fiducial marker tracks in the image space (x-y coordinates in pixel). FIG. 10c illustrates an overlay of the aligned fiducial marker tracks in the image space (x-y coordinates). FIG. 10d illustrates an overlay of the aligned fiducial marker tracks in the image space (y-z coordinates). It can be seen that after the assembly of peer matching, there were 105 tracks that covered more than 77 micrographs in the Adhesion belt dataset (~70% of the entire tilt series). Only the tracks that were long enough were used for projection parameter estimation. As shown in FIG. 10A, all the 105 tracks were used and the average length of tracks used for parameter optimization was 96.4, while the mean alignment residual was 0.37 pixel. FIGS. 10C and 10D showed the aligned tracks of the Adhesion belt dataset from different directions. The alignment was successful. The results were also compared with the ones of random sampling and it was found that there was no significant difference in the tracking accuracy. To achieve the approximate alignment, the random sampling method took 43.5 min in total, whereas the present method took only 6.7 min. Overall, the experimental results demonstrated that the theoretical upper bound was very useful for tracking algorithm design and the present disclosure can dramatically improve the tracking efficiency with good accuracy.

Figure 12:
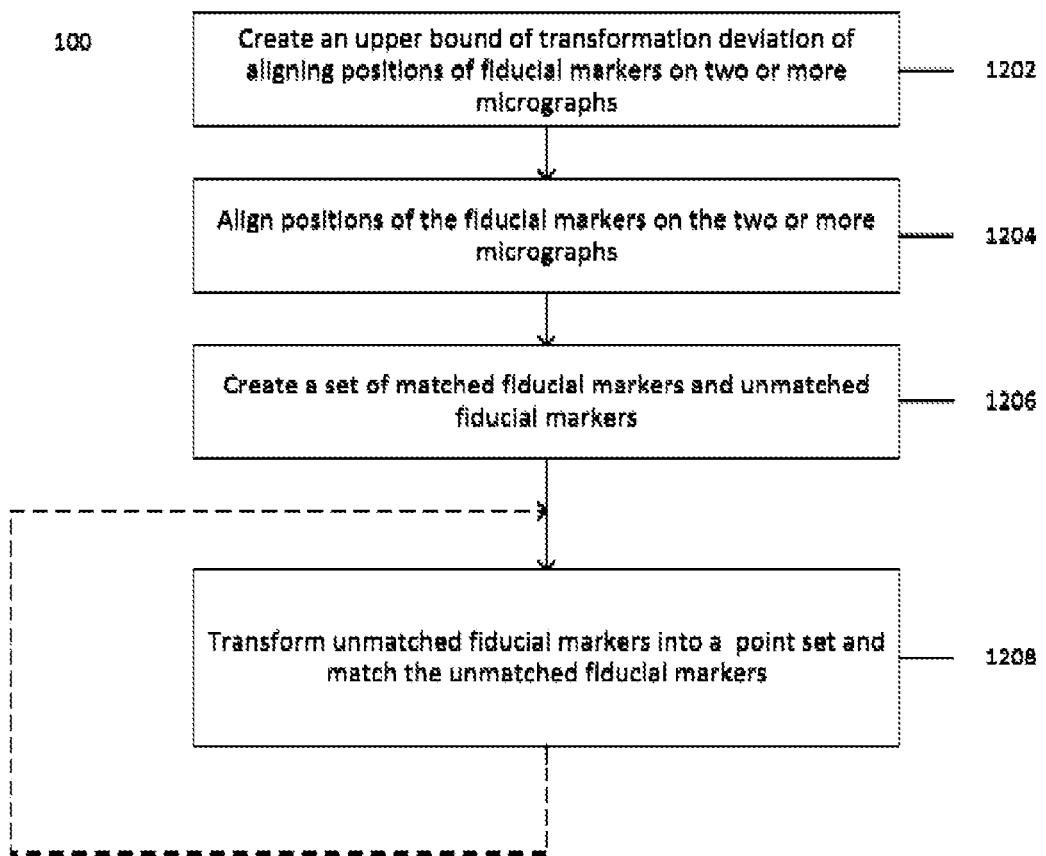
FIG. 12 illustrates a flow diagram of an example system in accordance with some embodiments discussed herein.

FIG. 12 illustrates an exemplary method in accordance with some embodiments discussed herein. In particular, FIG. 12 illustrates method 100 which includes creating an upper bound of transformation deviation of aligning positions of fiducial markers on two or more micrographs 1202, aligning positions of the fiducial markers on the two or more micrographs 1204, creating a set of matched fiducial markers and unmatched fiducial markers 1206, and transforming unmatched fiducial markers into a point set and match the unmatched fiducial markers 1208. In some embodiments, transforming unmatched fiducial markers into a point set and match the unmatched fiducial markers 1208 may be repeated until no more additional matched fiducial markers can be created. Method illustrated in FIG. 12 may be performed using any of the apparatuses, devices, circuitry, or combinations thereof discussed herein.

Discussion and Conclusion

Provided herein is fiducial marker tracking for tilt series alignment. Provided above is a discussion regarding the projection model in ET and then a theoretical upper bound of the deviation that allowed the positions of fiducial markers in two micrographs to be aligned by affine transformation. This theoretical bound may be very useful for the design of tracking methods, which can ensure that tracking using only 2D positions of the fiducial markers can be successful for most of the general tilt series. Then, the tracking of fiducial markers may be reduced to an incomplete point set registration problem. A GMM was introduced and a method based on it was used to make fiducial marker tracking more effective and efficient. Finally, provided herein is a divide-and-conquer method to resolve the lens distortion issue to ensure the reliability of the method. The real-world experimental results further support the proposed bound and demonstrated the effectiveness of the method. This work may make the fully automatic tracking for datasets with a large number of fiducial markers possible.

However, to achieve more reliable and accurate fully automatic fiducial marker-based alignment, additional steps may be taken.

Firstly, efforts on making the algebraic solution more robust for complex situations may be performed. Compared with the random sampling method (Han et al., 2015), the algebraic method may be much faster. However, the algebraic method may be sensitive to outliers compared to the random sampling method. The current version may stuck in datasets with extremely irregular fiducial marker distributions. This situation may often happen when aligning tilt series for subtomogram averaging, in which the motion of views may be large and may result in many fiducial markers outside the focus area, for example, 60 abruptly introduced outside markers versus 10 inside markers. Because the fiducial markers may be randomly distributed on the specimen and may not indicate a certain shape context, these abruptly introduced fiducial markers may appear as outliers and degenerate the probability distribution in our analysis. Fortunately, usually the subtomogram averaging applications may not use many fiducial markers and thus our previous random sampling method can handle such irregular datasets fast enough. In the future, analysis based on the marker density may be added to the model to cope with such situations.

Secondly, a more mature fiducial marker detection method may be needed for a robust fully automatic fiducial marker-based alignment. For datasets that have hundreds of fiducial markers embedded in, the algebraic solution may obviously be a better choice. Better performance of marker detection could offer a better fiducial marker distribution and further improve the tracking result. There are various studies that may describe the fiducial marker detection algorithms and may make a comparison of several state-of-the-art fiducial marker detection algorithms and draw the conclusion that none of them is superior to the others in all cases, which suggests that the choice of a marker detection algorithm may depend on the properties of the dataset to be analyzed. Considering the difference between a cryo-ET micrograph and a negative-stained micrograph, a feasible and accurate fiducial marker detection algorithm may fully use the intrinsic properties in the dataset. Recent development of machine learning techniques such as deep learning and bioimaging signal processing techniques such as NMR peak picking may be a promising direction for fiducial marker detection.

Many modifications and other embodiments of the inventions set forth herein will come to mind to one skilled in the art to which the inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for fiducial marker alignment, the apparatus comprising a processor and a memory storing computer instructions that, when executed by the processor, cause the apparatus to:
align positions of fiducial markers on two or more micrographs, wherein each micrograph is formed of a corresponding point set,
create a first set of matched fiducial markers and a first set of unmatched fiducial markers for each micrograph of the two or more micrographs; and
transform the first set of unmatched fiducial markers of a first micrograph into a transformed point sets and match (1) the transformed point set to (2) the first set of unmatched fiducial markers of a second micrograph, resulting in a second set of matched fiducial markers for the first micrograph,
wherein the second set of matched fiducial markers for the first micrograph results in improved alignment of a number of fiducial markers, in addition to the first set of matched fiducial markers, for the first micrograph.

2. The apparatus according to claim 1, wherein aligning positions of fiducial markers is by an affine transformation.

3. The apparatus according to claim 2, wherein the affine transformation is constrained by an upper bound of transformation deviation.

4. The apparatus according to claim 1, wherein creating the first set of matched fiducial markers comprises applying a Guassian mixture model.

5. The apparatus according to claim 1, wherein transforming the first set of unmatched fiducial markers comprises applying a second affine transformation.

6. The apparatus according to claim 1, wherein the computer instructions are configured to, when executed by the processor, cause the apparatus to repeatedly transform the first set of unmatched fiducial markers of another micrograph into an additional transformed point set and match the additional transformed point set to the first set of unmatched fiducial markers of yet another micrograph, resulting in an additional second set of matched fiducial markers until no more additional matched fiducial markers can be created.

7. The apparatus according to claim 1, wherein each of the two or more micrographs have a tilt angle and wherein none of the tilt angles of each of the two or more micrographs are equal.

8. The apparatus according to claim 7, wherein the tilt angles of each of the two or more micrographs differ by a single tilt angle interval and the tilt angle interval is 20° or less.

9. The apparatus according to claim 7, wherein the tilt angles of each of the two or more micrographs each differ by a tilt angle interval and at least one of the tilt angle intervals is at least 50°.

10. A method for fiducial marker alignment, the method comprising:
aligning positions of fiducial markers on two or more micrographs, wherein each micrograph is formed of a corresponding point set;
creating a first set of matched fiducial markers and a first set of unmatched fiducial markers for each micrograph of the two or more micrographs; and
transforming the first set of unmatched fiducial markers of a first micrograph into a transformed point sets and matching (1) the transformed point set to (2) the first set of unmatched fiducial markers of a second micrograph, resulting in a second set of matched fiducial markers for the first micrograph,
wherein the second set of matched fiducial markers for the first micrograph results in improved alignment of a number of fiducial markers, in addition to the first set of matched fiducial markers, for the first micrograph.

11. The method according to claim 10, wherein aligning positions of fiducial markers is by an affine transformation.

12. The method according to claim 11, wherein the affine transformation is constrained by an upper bound of transformation deviation.

13. The method according to claim 10, wherein creating the first set of matched fiducial markers comprises applying a Guassian mixture model.

14. The method according to claim 10, wherein transforming the first set of unmatched fiducial markers comprises applying a second affine transformation.

15. The method according to claim 10, further comprising repeatedly transforming the first set of unmatched fiducial markers or another micrograph into an additional transformed point set and matching the additional transformed set point to the first set of unmatched fiducial markers if yet another micrograph, resulting in an additional second set of matched fiducial markers until no more additional matched fiducial markers can be created.

16. The method according to claim 10, wherein each of the two or more micrographs have a tilt angle and wherein none of the tilt angles of each of the two or more micrographs are equal.

17. The method according to claim 16, wherein the tilt angles of each of the two or more micrographs differ by a single tilt angle interval and the tilt angle interval is 20° or less.

18. The method according to claim 16, wherein the tilt angles of each of the two or more micrographs each differ by a tilt angle interval and at least one of the tilt angle intervals is at least 50°.

19. A fiducial marker alignment apparatus comprising the apparatus of claim 1.

20. An electron tomography apparatus comprising the apparatus of claim 1.

* * * * *